United States Patent

Moroto et al.

Patent Number: 5,121,326
Date of Patent: Jun. 9, 1992

[54] DISPLAY SYSTEM IN NAVIGATION APPARATUS

[75] Inventors: Shuzo Moroto; Shoji Yokoyama; Mitsuhiro Nimura; Akimasa Nanba; Takashi Yamada; Koji Sumiya, all of Anjo, Japan

[73] Assignees: Aisin Aw Co., Ltd.; Kabushiki Kaisha Shinsangyokaihatsu, both of Japan

[21] Appl. No.: 666,485

[22] Filed: Mar. 6, 1991

Related U.S. Application Data

[63] Continuation of Ser. No. 408,482, filed as PCT/JP88/01299, Dec. 23, 1988, abandoned.

[30] Foreign Application Priority Data

Dec. 28, 1987 [JP] Japan .................. 62-333047
Jul. 18, 1988 [JP] Japan .................. 63-178426
Sep. 12, 1988 [JP] Japan .................. 63-227828

[51] Int. Cl.$^5$ .................................. G06F 15/50
[52] U.S. Cl. ............................ 364/449; 340/995
[58] Field of Search .............. 364/443, 444, 449; 340/940, 995

[56] References Cited

U.S. PATENT DOCUMENTS

| | | | |
|---|---|---|---|
| 4,570,227 | 2/1986 | Tachi et al. | |
| 4,675,676 | 6/1987 | Takamake et al. | |
| 4,737,916 | 4/1988 | Ogawa et al. | 364/443 |
| 4,796,189 | 1/1989 | Nakayama et al. | 364/449 |
| 4,926,336 | 5/1990 | Yamada | 364/444 |

Primary Examiner—Thomas G. Black
Attorney, Agent, or Firm—Lorusso & Loud

[57] ABSTRACT

A display system in a navigation apparatus according to the invention has course searching means (13) for searching out an optimum course based on position information, node data (21), intersection data (19) and road data (23), and scale ratio setting means (15), wherein the scale ratio of a displayed map is set in conformity with distance between a present position and a destination, and roads are selectively displayed on a display unit (31) in conformity with the scale ratio.

Further, the invention has a data processing controller (46) for performing processing based on a departure intersection entered at an input unit (43), a display unit for displaying, based on the results of processing, an intersection diagram comprising the departure intersection, a peripheral road network and landmarks, and touch keys (35) such as a verification key for displaying direction of travel on the displayed intersection map, and a rotation instruction key for rotating and displaying the intersection diagram.

In addition, the invention includes display means (48) for displaying an intersection diagram, in which direction of travel is pointed upward, and intersection landmark patterns, map data (53) stored as a relationship among roads, intersections and intersection landmarks, and as coordinated, and a data processing controller (46) for reading, from the map data (53), positional coordinates of an intersection landmark to be displayed, rotating and enlarging the positional coordinates and transforming them into coordinates of a display area set on the display means, and sending an output signal to the display means (48) in such a manner that the intersection landmark patterns are displayed on the transformed coordinates.

7 Claims, 35 Drawing Sheets

FIG. 2

| DISTANCE TO DISTINATION | SCALE RATIO | DISPLAYED ROAD RANK |
|---|---|---|
| $a_1$ | $1/n_1$ | 1 |
| $a_2$ | $1/n_2$ | 2 |
| $a_3$ | $1/n_3$ | 3 |
| ⋮ | ⋮ | ⋮ |

| ROAD RANK | DISPLAYED ROAD |
|---|---|
| 1 | NATIONAL ROAD, PREFECTURAL ROAD |
| 2 | PREFECTURAL ROAD, CITY ROAD |
| 3 | CITY ROAD, TOWN ROAD |
| 4 | OTHER ROADS |
| ⋮ | ⋮ |

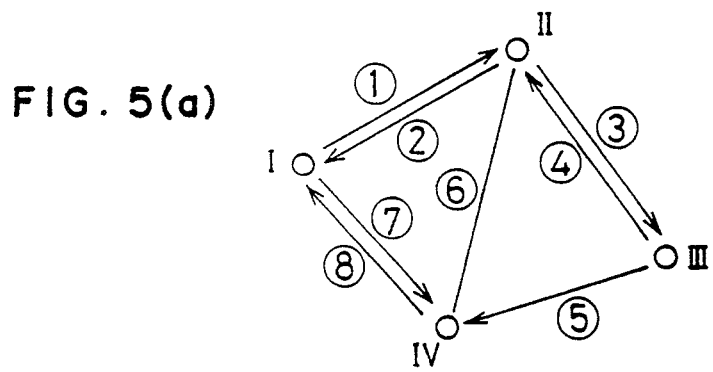

FIG. 5(b)

| INTERSEC-TION NO. | INTERSEC-TION NAME | SMALLEST NO. ROAD HAVING THIS INTERSEC-TION AS START-ING POINT | SMALLEST NO. ROAD HAVING THIS INTERSEC-TION AS END POINT | TRAFFIC SIGNAL PRESENT ? |
|---|---|---|---|---|
| I | KANDA | ① | ② | YES |
| II | YUSHIMA | ② | ① | YES |
| III | ○ ○ | ④ | ③ | NO |
| IV | △ △ | ⑥ | ⑤ | NO |

FIG. 5(c)

| ROAD NO. | START-ING POINT | END POINT | NUMBER OF NEXT ROAD HAVING SAME STARTING ROAD | NUMBER OF NEXT ROAD HAVING SAME END POINT | ROAD WIDTH | PRO-HIBI-TION (1) | PRO-HIBI-TION (2) | GUID-ANCE UN-NECES-SARY | PHO-TO-GRAPH NO. | NUM-BER OF NODES | LEAD-ING AD-RESS OF NODE SE-RIES DATA | LENGTH |
|---|---|---|---|---|---|---|---|---|---|---|---|---|
| ① | I | II | ⑦ | ④ | 1 | – | – | ③ | 1 | 15 | 100 | |
| ② | II | I | ③ | ⑧ | 1 | – | – | ⑦ | 2 | 13 | 200 | |
| ③ | II | III | ② | ③ | 2 | – | – | ⑤ | 3 | 9 | 300 | |
| ④ | III | II | ⑤ | ⑥ | 2 | – | – | ② | 4 | 20 | 500 | |
| ⑤ | III | IV | ④ | ⑦ | 2 | ⑥ | – | ⑧ | 5 | 25 | 600 | |
| ⑥ | IV | II | ⑧ | ① | 1 | ③ | ② | – | 6 | 30 | 700 | |
| ⑦ | I | IV | ① | ⑤ | 0 | – | – | – | 7 | 9 | 800 | |
| ⑧ | IV | I | ⑥ | ② | 0 | – | – | ① | 8 | 3 | 900 | |

FIG. 5(d)

| ADDRESS | EAST LONGITUDE | NORTH LATITUDE | ATTRIBUTE |
|---|---|---|---|
| | 135.5 | 35.1 | 01 |
| | 135.6 | 35.2 | 01 |
| 100 | | | |
| ⋮ | | | |
| 200 | | | |
| ⋮ | | | |

FIG. 6(a)

| INTERSECTION NAME |
|---|
| INTERSECTION NO. |
| PHOTOGRAPH NO. |
| ANGLE |
| DISTANCE |
| INTERSECTION NAME |
| ⋮ |

FIG. 6(b)

| EAST LONGITUDE |
|---|
| NORTH LATITUDE |
| INTERSECTION NO. |
| ATTRIBUTE |
| ANGLE |
| DISTANCE |
| EAST LONGITUDE |
| ⋮ |

INTERSECTION DIAGRAM FOR INTERSECTION NO. V HAVING ROAD ⑧ AS ENTERING ROAD

"ROTATION" INPUT

INTERSECTION DIAGRAM FOR INTERSECTION NO. V HAVING ROAD ⑪ AS ENTERING ROAD

INTERSECTION DIAGRAM FOR INTERSECTION NO. V HAVING ROAD ⑬ AS ENTERING ROAD

FIG. 7(d)
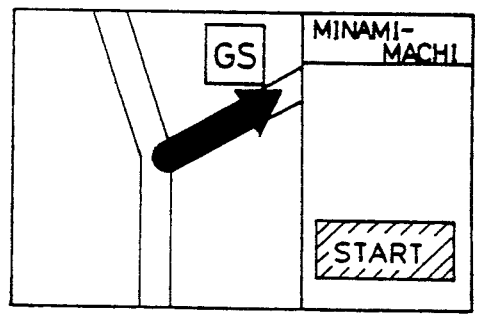
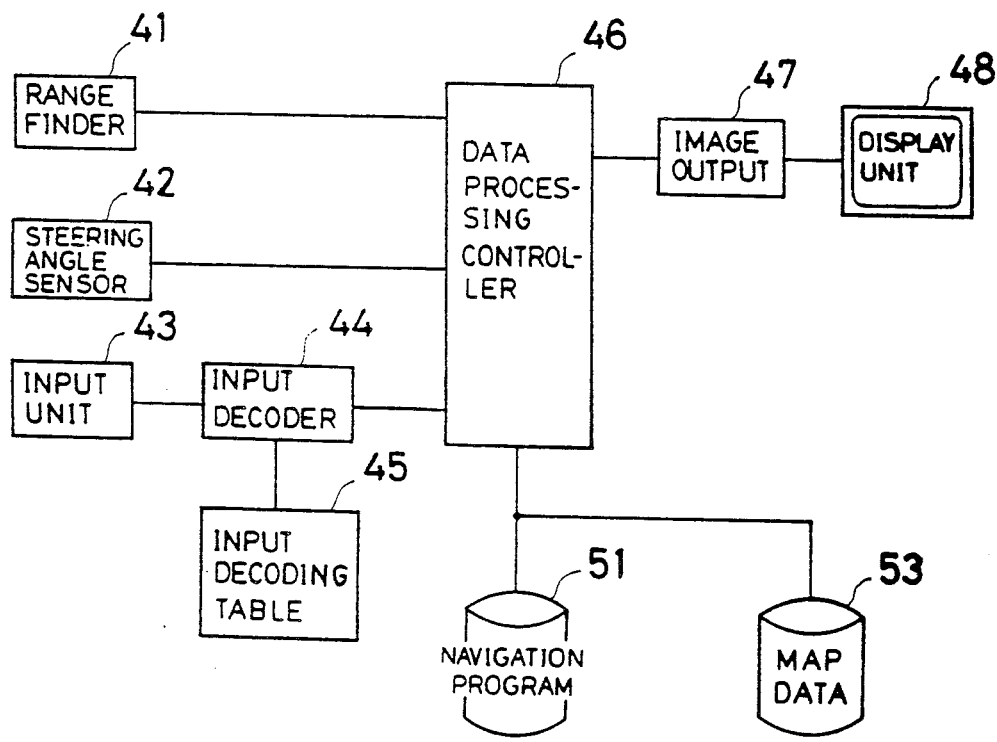
FIG. 8

INTERSECTION DATA

| INTER-SECTION NO. | EXITING ROAD | ENTERING ROAD | (EAST LONGITUDE, NORTH LATITUDE) | INTERSECTION NAME | LANDMARK POINTER |
|---|---|---|---|---|---|
| I | ② | ① | (50, 150) | FRONT OF MINAMI ANJO STN. | B000 |
| II | ① | ② | (10, 100) | MINAMI ANJO STN. | B00C |
| III | ⑥ | ⑤ | (150, 150) | ASAHI-MACH | ⋮ |
| IV | ④ | ③ | (100, 100) | AIOI-CHO | ⋮ |
| V | ⑦ | ⑧ | (50, 50) | MINAMI-MACHI | ⋮ |
| VI | ⑬ | ⑭ | (10, 10) |  | ⋮ |
| VII | ⑩ | ⑨ | (150, 20) |  | ⋮ |

FIG. 9(b)

ROAD DATA

| ROAD NO. | NO. OF NEXT ROAD HAVING SAME STARTING POINT | NO. OF NEXT ROAD HAVING SAME END POINT | STARTING POINT | END POINT | NODE SERIES POINTER | ROAD LENGTH |
|---|---|---|---|---|---|---|
| ① | ⑪ | ④ | II | I | A000 | 1000 |
| ② | ③ | ⑫ | I | II | A0A0 | 1000 |
| ③ | ② | ⑥ | I | IV | A0B3 | 2000 |
| ④ | ⑤ | ① | IV | I | A0C0 | 2000 |
| ⑤ | ⑧ | ⑤ | IV | III | A0DE | 1500 |
| ⑥ | ⑥ | ⑦ | III | IV | A101 | 1500 |
| ⑦ | ⑫ | ⑩ | V | IV | A201 | 800 |
| ⑧ | ⑨ | ⑪ | IV | V | A221 | 800 |
| ⑨ | ④ | ⑨ | IV | VII | A253 | ⋮ |
| ⑩ | ⑩ | ③ | VII | IV | A260 | ⋮ |
| ⑪ | ① | ⑬ | I | V | A265 | ⋮ |
| ⑫ | ⑭ | ② | V | II | A28B | ⋮ |
| ⑬ | ⑬ | ⑧ | VI | V | A2A0 | ⋮ |
| ⑭ | ⑦ | ⑭ | V | VI | A2B0 | ⋮ |

FIG. 9(c)

NODE SERIES DATA

A000 — 15 ← NUMBER OF NODES (EAST LONGITUDE, NORTH LATITUDE)

INTERSECTION TARGET DATA

| Address | Value | Description |
|---|---|---|
| B000 | 1 | NUMBER OF LANDMARKS (FOR EVERY INTERSECTION) |
| | 2 | LANDMARK NO. |
| | 50.5 | LANDMARK CENTER EAST-LONGITUDE COORDINATE |
| | 150.5 | LANDMARK CENTER NORTH-LATITUDE COORDINATE |
| B00C | 2 | |
| | 3 | |
| | 10.5 | |
| | 99.5 | |

FIG. 9(e)

LANDMARK PATTERN DATA

| | |
|---|---|
| LANDMARK NO.1 | LANDMARK PATTERN |
| LANDMARK NO.2 | |

FIG. 9(f)

DESTINATION INPUT

GUIDANCE OUTPUT

TRAVELLING DIRECTION DATA

| INTERSECTION NO. | ROAD TO BE TRAVELLED ON |
|---|---|
| I | ∅ |
| II | ① |
| III | ⑥ |
| IV | ④ |
| V | ⑫ |
| VI | ⑬ |
| VII | ⑩ |

| INTER-SECTION NO. | EAST LONGI-TUDE | NORTH LATI-TUDE | SMALLEST NO. OF EXITING ROAD | SMALLEST NO. OF ENTERING ROAD | NUMBER OF EXITING ROADS | NUMBER OF ENTERING ROADS | INTER-SECTION LANDMARK POINTER |
|---|---|---|---|---|---|---|---|
| 1 | 135.5 | 35.5 | 1 | 2 | 3 | 3 | 1 |
| 2 | 135.4 | 35.4 | 2 | 1 | 1 | 1 | — |
| 3 | 135.6 | 35.5 | 4 | 3 | 1 | 1 | — |
| 4 | 135.5 | 35.6 | 6 | 5 | 1 | 1 | — |

| ROAD NO. | STARTING-POINT INTERSECTION | END-POINT INTERSECTION | NO. OF ROAD HAVING SAME STARTING POINT | NO. OF ROAD HAVING SAME END POINT | NODE SERIES POINTER |
|---|---|---|---|---|---|
| 1 | 1 | 2 | 3 | 1 | 1 |
| 2 | 2 | 1 | 2 | 4 | 2 |
| 3 | 1 | 3 | 5 | 3 | 3 |
| 4 | 3 | 1 | 4 | 6 | 4 |
| 5 | 1 | 4 | 1 | 5 | 5 |
| 6 | 4 | 1 | 6 | 2 | 6 |

| INTERSECTION LANDMARK POINTER | NUMBER OF LANDMARKS | E. LONGITUDE OF LANDMARK CENTER POSITION | N. LATITUDE OF LANDMARK CENTER POSITION | LANDMARK PATTERN NO. |
|---|---|---|---|---|
| 1 | 1 | 135.54 | 35.53 | 2 |

DISPLAY SYSTEM IN NAVIGATION APPARATUS

This application is a continuation of application Ser. No. 07/408,482 filed Aug. 23, 1989 now abandoned.

TECHNICAL FIELD

This invention relates to a display system in a navigation apparatus which, upon being provided with an input of a desired destination and present position, outputs guidance for travel to the destination.

BACKGROUND ART

A navigation apparatus provides a driver, who is unfamiliar with the local geography, with course guidance for travel from a departure point or present position to a destination in response to entry of departure point or present position and destination before travel starts. Many proposals relating to this navigation apparatus have been made in recent years.

FIG. 40 is a view for illustrating a prior-art example of a navigation apparatus.

As shown in FIG. 40, the conventional navigation apparatus is known to have a display system in which a map is displayed on a CRT screen and vehicle position 72, a course 71, a destination position 73 and paths of travel to the destination are displayed in a form superimposed on the map. Also known is a system, as disclosed in Japanese Patent Application Laid-Open No. 62-51000, in which an enlarged view of the vicinity of an intersection is possessed as image data and route guidance to the intersection is provided by displaying arrows.

However, a CRT screen for vehicles which displays a map from a present position to a destination is small in size, e.g., on the order of six inches. Consequently, when a large number of roads are displayed, particularly when travelling a long distance, it is difficult for the driver to tell which course to follow.

In addition, with an arrangement which displays a map showing only information from the point of departure to the destination, it is required that the map be prepared and stored in a memory unit in advance. Also, if there is an increase in the number of intersections at which turns are to be made, the map becomes difficult to read.

In a navigation apparatus, consideration has been given to a system in which guidance is provided at an intersection located at the point of departure, this guidance being the shape of the intersection, the orientation of landmarks and the name of the intersection displayed on a display screen by entering the number of the intersection located at the departure point. The road along which the vehicle is to proceed is indicated by a arrow on the diagram of the intersection. In accordance with this system, the driver identifies the pertinent intersection based on the displayed information. By entering "START" when the vehicle passes through the intersection, the driver is taught the present position and travel guidance starts.

With the foregoing system, however, the present position cannot be specified until the entry of present position ends; hence, the diagram of the intersection cannot be displayed in such a manner that the direction of travel will point from the bottom to the top of the display. Accordingly, in such case the diagram of the intersection generally is displayed with north being taken at the top of the screen. As a consequence, even if the vehicle is in the vicinity of the intersection, it is difficult for the driver to recognize on which road of the displayed intersection the vehicle is located. Further, when the direction of travel is indicated by an arrow display, as shown for example in FIG. 41, the arrow will point to the left if the vehicle is located above the intersection. As a result, the driver may misunderstand the display and turn in the opposite direction, namely left, when a right turn is to be made.

An arrangement has also been conceived in which intersection landmarks such as gasoline stations, banks and the like are included, and displayed, as image patterns in the image data indicating the vicinity of the intersection. However, if the diagram of the intersection is displayed with the direction of travel pointed toward the top of the screen, the intersection landmarks may be tilted or turned upside down and, hence, read incorrectly.

The present invention seeks to solve the foregoing problems and its object is to provide a display system in a navigation apparatus in which the required information is displayed in a form easy for the driver to read so that the information can be understood correctly in a short period of time.

Another object of the present invention is to provide a display system in a navigation apparatus in which, when an intersection at a point of departure is displayed, the diagram of the intersection is displayed in such a manner that the road at which the vehicle is presently located is shown below the departure intersection, namely in such a manner that the road leads to the intersection from below it.

A further object of the present invention is to provide a display system in a navigation apparatus in which intersection landmarks can be displayed on an intersection diagram in which the direction of travel points toward the top of the screen.

DISCLOSURE OF THE INVENTION

In order to attain the foregoing objects, the invention provides a display system in a navigation apparatus for providing guidance along a course by setting the course from a designated point of departure and destination, characterized by having course searching means for searching out an optimum course based on position information, node data comprising information relating to attributes of the position information, intersection data comprising information relating to intersections, and road data comprising information relating to roads, and scale ratio setting means for setting a scale ratio of a displayed map, wherein the scale ratio of the displayed map is set in conformity with distance between a present position and the destination, and roads are selectively displayed in conformity with the scale ratio.

Further, the invention is characterized in that, in a navigation apparatus for providing travel guidance to a destination in response to inputs of the destination and present position, an intersection diagram comprising a departure intersection, a peripheral road network and landmarks is displayed when the departure intersection is entered, direction of travel is displayed on the intersection map, and the intersection diagram is displayed upon being rotated by a rotation instruction.

Further, the invention is characterized in that, in a navigation apparatus for outputting guidance information in accordance with a preset course, there are provided display means for displaying an intersection diagram, in which direction of travel is pointed upward, and intersection landmark patterns, and map data stored as a relationship among roads, intersections and intersection landmarks, and as coordinates, wherein positional coordinates of an intersection landmark to be displayed are read from the map data, the positional coordinates are rotated, enlarged and transformed into coordinates of a display area set on the display means, and the intersection landmark patterns are displayed on the transformed coordinates. The invention is further characterized in that the intersection diagram is displayed and prepared from the map data.

Thus, in the present invention, during travel along a course set based on departure point and destination, the scale ratio of the displayed map is changed in dependence upon distance remaining to the destination, and the required road is selected and displayed in conformity with the scale ratio. This simplifies the display and makes it easier for the driver to ascertain the course while driving and to understand the information correctly in a short period of time. This makes confident driving possible.

Further, in the present invention, an intersection diagram comprising the departure intersection and peripheral road network is displayed when the departure intersection is entered, the direction of travel is displayed on the intersection diagram, and the intersection diagram is rotated by a rotation instruction. Therefore, the driver is capable of rotating the intersection diagram in such a manner that the intersection is entered from therebelow. Accordingly, the road on which the vehicle is presently located can be verified, while rotating the intersection diagram, by relying upon the landmarks on the intersection diagram. This makes it possible to prevent erroneous reading of the direction of travel at the departure intersection.

Further, in the present invention, landmark pattern numbers and landmark positions, the numbers of which correspond to the number of intersection landmarks, are read from an intersection landmark pointer indicative of the intersection, landmark patterns for the landmark numbers are read from a landmark pattern file, landmark coordinates are transformed into display screen coordinates by enlargement and rotation, and the landmark patterns are displayed at the calculated screen coordinates. Accordingly, intersection landmarks can be displayed on the intersection diagram at easy-to-see positions. And even if the intersection diagram has the direction of travel pointed upward, the information necessary for travel along the course can be accurately acquired, thereby placing the driver at ease.

BRIEF DESCRIPTION OF THE DRAWINGS

FIG. 2 is a view showing the relationship among distance to a destination, scale ratio and displayed roads;

FIG. 3 is a view showing a road display table;

FIGS. 5a-5d are a views showing examples of road network and intersection data, road data and node series data;

FIGS. 6a-6b are views showing an intersection series and node series data;

FIGS. 7a-7d are views showing another embodiment of a display system in a navigation apparatus according to the present invention;

FIG. 8 is a view showing an example of the system construction of a navigation apparatus to which the embodiment is applied;

FIGS. 9a-9f are views showing an example of the road network and intersection data, road data and node series data;

BEST MODE FOR CARRYING OUT THE INVENTION

Embodiments of the invention will now described.

Figure 1:
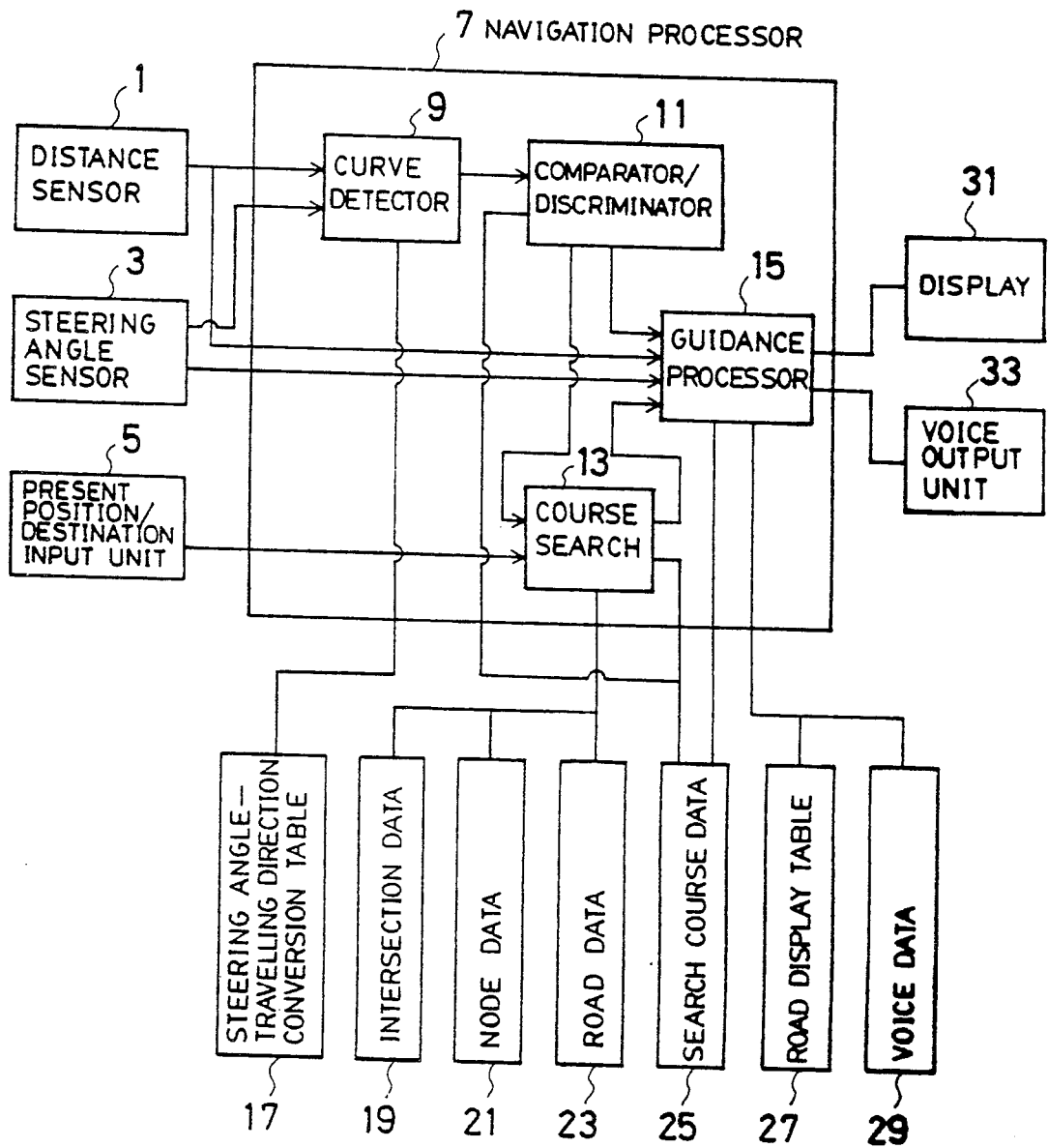
FIG. 1 is a view illustrating the construction of a system used in an embodiment of the display system in the navigation apparatus according to the present invention.

In FIG. 1, a distance sensor 1 measures the travelling distance of a vehicle. For example, the distance sensor can be one which senses and counts the revolution of a wheel, or which senses acceleration and subjects the result to double integration. Other measuring means may be employed as well. A steering angle sensor 3 senses whether or not a turn has been made at an intersection. For example, this can be an optical rotation sensor or rotatable resistor mounted on a rotating portion of a steering wheel, or an angle sensor mounted on a wheel portion. A present location/destination input unit 5 is a joy stick, gear or touch panel, or means coupled with the screen of a display unit 31 for displaying keys or a menu on the screen so that inputs can be made from the screen.

A navigation processing unit 7 forms the nucleus of the navigation apparatus and has a curve detector, a comparator/decision unit 11, a course search unit 13 and a guidance processor 15.

The course search unit 13 is so adapted that when present location and destination are entered from the input unit 5, course search is performed upon reading intersection data, node data and road data, of the kind described below, out of respective files, and the searched course is stored in a file 25.

The curve detector 9 reads detection outputs from the distance sensor 1 and steering angle sensor 3 and detects a change in vehicle orientation upon referring to a steering angle - travelling direction table 17.

The comparator/decision unit 11 determines whether or not the vehicle is travelling along the course by comparing course data, which has been retrieved in the vicinity of a guidance intersection or between guidance intersections on the course, and travel data from the curve detector 9.

The guidance processor 15 executes processing for successively projecting guidance intersections of a retrieved course or characterizing photographs along the course, displaying guidance maps, displaying distance remaining to the next intersection and other guidance information, broadcasting guidance by voice from a voice output unit 25, and displaying a message to the effect that the vehicle has strayed off course when this event is detected, or informing the driver by voice that the vehicle has strayed off course. As shown in FIG. 2, a scale ratio is set in conformity with distance to the destination and the rank of a displayed rank is set. In this case, a scale ratio is calculated in such a manner that departure point and destination or present position and destination fall within the range of the map display. As shown in FIG. 3, the displayed roads are prepared beforehand in the form of a table and ranked as national roads, prefectural roads, other roads or roads classified by number of lanes. When distance to a destination is calculated and then the scale ratio, the table of FIG. 3 is referred to select the road to be displayed, and this road is then displayed.

By way of example, when travelling from Nagoya to Kyoto, the road between Nagoya and Kyoto is displayed as being a freeway. In conformity with the distance between the present position and the destination within the Kyoto city limits, only main roads such as national roads are displayed, or minor roads are displayed along with trunk roads when the vehicle nears the objective. The displayed map is thus simplified. Thus, if the vehicle is far from the destination, the trunk roads are displayed but not the unnecessary minor roads. When the vehicle nears the destination, the minor roads are also displayed. Accordingly, the display is simplified and becomes easier to read. This makes it possible to readily understand the display even while the vehicle is being driven.

Figure 4A:
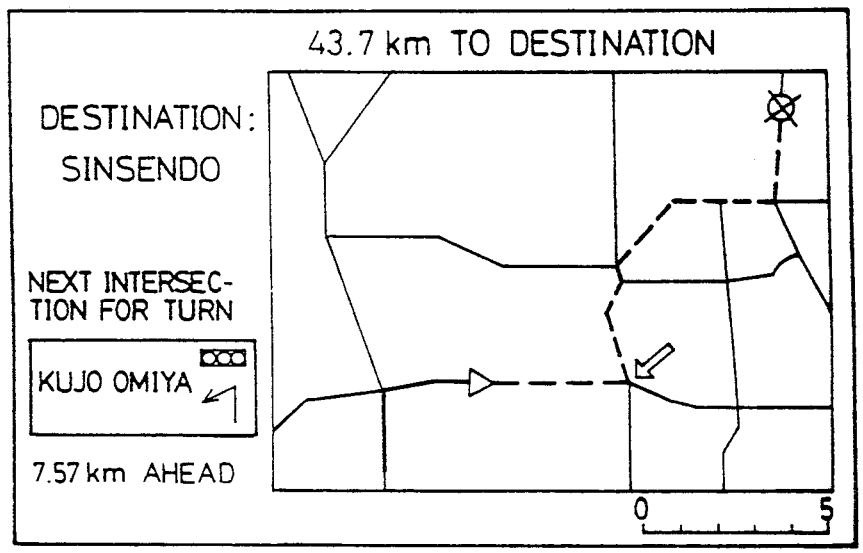
FIGS. 4a and 4b are views showing examples of display screens according to the present invention.
Figure 4B:
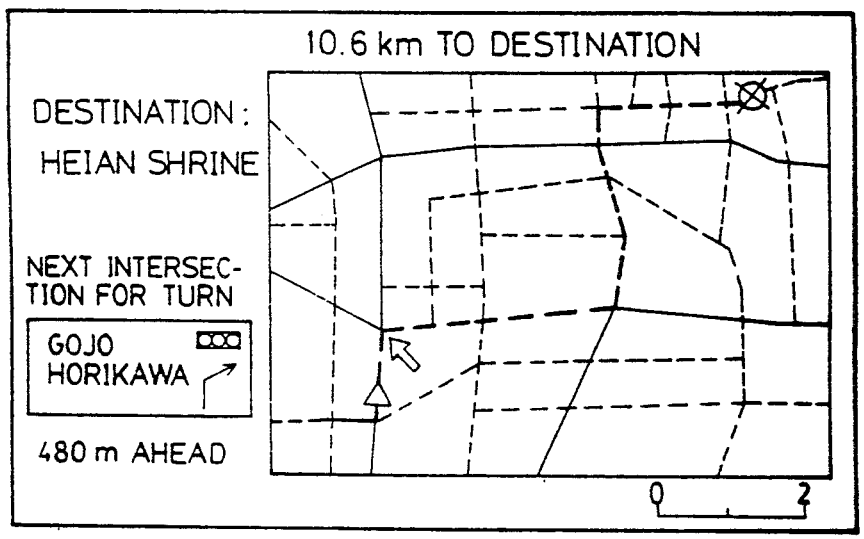

FIGS. 4(a), (b) illustrate examples of the display unit, in which (a) shows the display when the distance remaining from the present position to the destination is 43.7 km, and (b) the display when this distance is 10.6 km. The destination is displayed and position marked, the distance to the destination is also displayed, and the present position of the vehicle is displayed by an arrow pointing in the direction of travel. Also displayed are the geographical point at which guidance is to provided next, the name of an intersection at which a turn is to be made, the distance thereto, the presence of signals, the directions of turns and positions on the map. Course is displayed in different colors or thicknesses. By way of example, course traversed so far may be displayed in blue, and course to be traversed henceforth may be displayed by a thick, red line. Course may thus be readily understood by the driver at a single glance.

Furthermore, scale is displayed on the display to make the scale ratio clear. When the distance remaining from the present position to the destination is 43.7 km (a), only the main roads are displayed, but when the remaining distance is 10.6 km (b), minor roads are also displayed. Thus, it is arranged so that the driver will not mistake the intersection at which a turn is to be made. In general, the map is displayed with north at the top of the screen. However, it is permissible to scroll the display in such a manner that the direction of vehicle travel will point upward on the screen.

Intersection data, node data and road data used used in course search will now be described.

The intersection data constitute information such as the roads that cross at an intersection, the node data constitute information regarding pedestrian crossings and tunnels that can be detected by sensors at characteristic points along the source, and the road data constitute information relating to starting points, end points and the roads between them.

FIG. 5 shows views illustrating examples of the intersection data 19 representing information such as road networks and the roads crossing at the intersections in the road networks, the road data 23 relating to starting and end points and the associated roads, and the node data 21 representing information regarding pedestrian crossings and tunnels detectable by sensor at characteristic points along the course.

In order for the driver to accurately grasp vehicle distance from the present position to the destination at all times, the intersection data will have the data configuration shown in (b) of FIG. 5, the road data will have the data configuration shown in (c), and the node data will have the data configuration shown in (d) in a case where a road network comprises, e.g., road numbers ①-⑧ of intersection numbers I-IV as shown in FIG. 5(a).

Specifically, as shown in (b) of FIG. 5, the intersection data comprises intersection names corresponding to the intersections numbers I–IV, road numbers having the smallest numbers among those roads possessing a certain intersection as a starting point, road numbers having the smallest numbers among those roads possessing a certain intersection as an end point, and information indicating whether or not a certain intersection has a traffic signal.

As shown in (c) of FIG. 5, the road data comprises starting and end points, in the form of intersection numbers, of the road numbers (1) through (8), the numbers of roads having the same starting point, the numbers of roads having the same end point, road width, information relating to prohibitions, information relating to guidance not required, photograph numbers, the numbers of nodes, the leading addresses of node series data, length, etc.

As shown in (d) of FIG. 5, the node array data comprises information relating to east longitude, north latitude, attributes and the like. The units of the road numbers comprise a plurality of nodes, as is evident from the road data. More specifically, the node data is data relating to one point on a road. If a line connecting nodes is referred to as an arc, a road is expressed by connecting each of a plurality of node arrays by arcs. For example, with regard to road number ①, the road comprises 15 nodes and the leading address of the node array data is 100, based on the road data. Therefore, road number ① is composed of node data having addresses 100 to 114.

Assume a case where the intersection is intersection number I, for example. For a course having this intersection as a starting point, in accordance with these network data, first road number (1) is retrieved from the starting point information of the intersection point data, then road number (7) is retrieved from the road data relating to the road number ①, namely from the column reading "NO. OF ROAD HAVING SAME STARTING POINT". Since the same information for road number ⑦ will, in converse fashion, lead to retrieval of road number ①, it can be determined that there are no other road numbers available as peripheral roads. The same will hold true with regard to end points. Further, since road number ⑥ will be prohibited in case of road number ⑤ in the road data, the vehicle will not be able to enter road number ⑥ from road number ⑤ at the intersection number IV shown in FIG. 5(a) because turns are prohibited at this intersection. The only road that can be entered is the road number ⑧. Accordingly, guidance to road number ⑧ is unnecessary.

FIG. 6 illustrates data generated by course retrieval, in which (a) is intersection series data and (b) is node series data. The former comprises information such as intersection name, intersection number, photograph number of a photograph showing the characteristic scenery of the intersection, angle of turn, distance and the like. The node series data comprises information such as east longitude and north latitude representing a node position, intersection number, attribute, angle, distance and the like. Moreover, these data comprise indicative solely of intersections requiring guidance; data relating to intersections not requiring guidance are excluded. Accordingly, in displaying a course, these data are read out successively in correspondence with a prescribed position to calculate present position so that distance remaining to the destination can be obtained.

Another embodiment of the present invention will now be described.

Figure 7A:
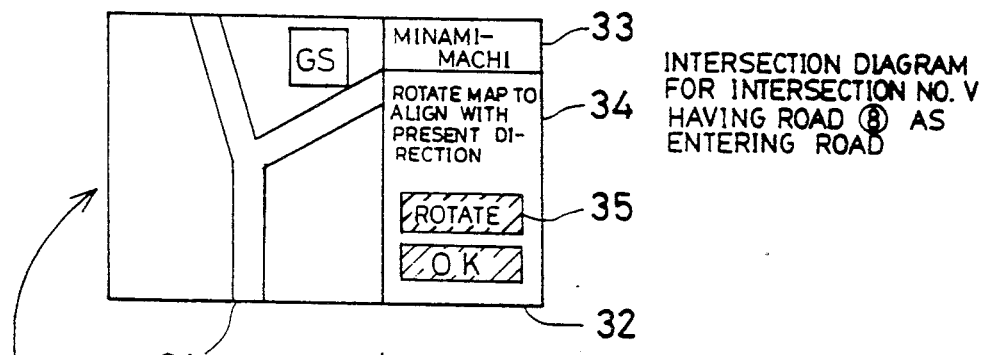
Figure 7B:
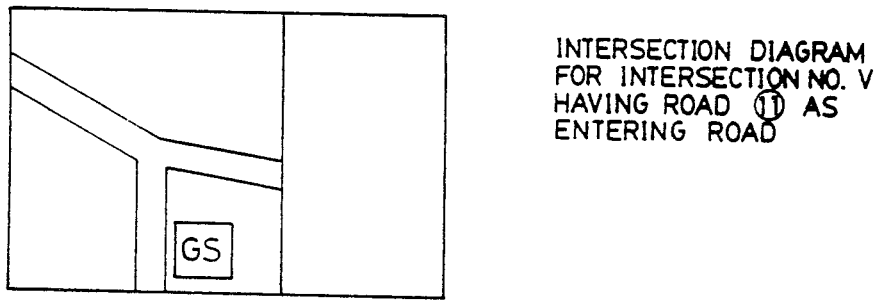
Figure 7C:
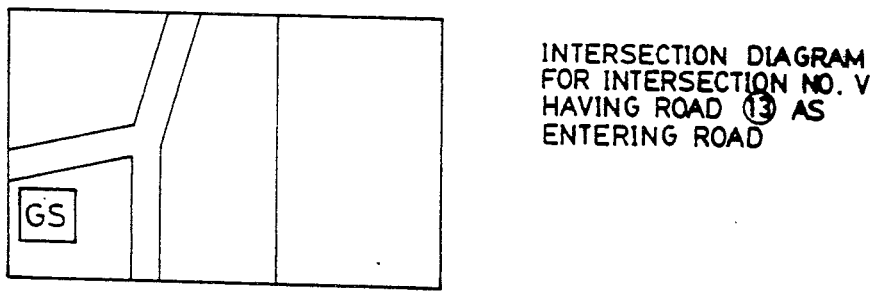

In FIG. 7, an intersection diagram is divided into a road network display area 31 and a function display area 32. An intersection at the point of departure is displayed at the center of the road network display area 31, the peripheral road network and a landmark such as a gasoline station GS are also displayed in this area. Displayed in the function display area 32 are an intersection name 33, a message 34 and touch keys 35. The touch keys 35 include a "ROTATE" key for instructing rotation, an "OK" key for confirming the angle of rotation of the intersection diagram, and a "START" key for instructing the start of navigation. Inputs are made by touching these keys on the screen. FIGS. 7(a), (b) and (c) illustrate examples in which the display is rotated in such a manner that each road entering the intersection is pointed toward the bottom of the screen. When the intersection diagram is rotated in the sequence ①→ⓑ→ⓒ→ⓐ→..., the key that is touched to make the input is the "ROTATE" key. When the intersection diagram having the desired angle of rotation has been obtained, the "OK" key is touched in order to confirm the displayed state. When the "OK" key is touched, the travelling direction from the intersection to the destination is displayed in the form of an arrow, as shown in FIG. 7(d), and the "START" key is displayed instead of the "ROTATE" key and "OK" key. Accordingly, by touching the "ROTATE" key, the driver is capable of rotating the intersection diagram in such a manner that the road for entering the intersection, namely the road on which the vehicle is presently located, is brought to the bottom of the screen. Then, by touching the "OK" key, the operator can cause the direction of travel to be displayed. Thus, as shown in FIG. 7(d), the driver need only enter the intersection by travelling from the bottom toward the top of the screen and select a road having the same direction as the arrow mark on the screen, i.e., turn right if the arrow points to the right or left if the arrow points to the left. Accordingly, the display matches the sense of vehicle travel so that the driver can readily ascertain intersection landmarks, direction of travel and relative positional relationships. As a result, the driver will not make a mistake at an intersection.

An example of a navigation apparatus to which the present invention is applied will now be described.

In FIG. 8, a range finder 41 measures the distance travelled by an automotive vehicle in the same manner as the distance sensor 1 shown in FIG. 1. A steering angle sensor 42 senses whether the vehicle has turned at an intersection in the same manner as the steering angle sensor 2 of FIG. 1.

An input unit 43 is a joy stick, key or touch-type panel Alternatively, the input unit 43 can be interlocked with the screen of a display unit 48, and a key or menu can be displayed on the screen to enable inputs to be made from the screen.

An input decoder 44 is adapted to decode input data from the input unit 43 while referring to the input decoding table 45. When a course is to be set, for example, the present position of the vehicle and the destination are inputted in the form of codes, whereupon the input decoder effects a conversion into present position data and destination data based on the codes by referring to an input decoding table 45. Accordingly, the input decoding table 45 is set in accordance with the kind of input or information received from the input unit 43.

A data processing controller 46 is the brain of the navigation apparatus. When present position and destination have been selected and set at the input unit 43, the controller 46 calls and executes navigation programs for this course from a file 51 storing the data. Each navigation program is designed to set a course, display a road map on the screen of a display unit 48 along the travelled course, output a route guidance display for an intersection at which a turn is to be made, the distance remaining to the intersection, and other guidance information. A file 54 stores the map data (road network data) for the foregoing. An image output controller 47 control the image outputted to the display unit 48.

In accordance with the above-described navigation system, the present position and destination are entered from the input unit 43 before travel starts, whereupon the data processing controller 46 reads and the navigation program corresponding to this course out of the file 51 and executes the program.

In accordance with the course, and on the basis of the measurement information from the range finder 41 and steering angle sensor 42, the navigation program calculates vehicle position, displays the course information map, present location and the like, and informs the driver of landmarks and intersections along the route, via the display unit 48. In order to assure the driver that he has not strayed off the course when the distance between intersections is great, for example, a photograph of landmarks being passed may be projected on the display screen. Alternatively, the information map and vehicle position may be displayed to inform the driver of the travelling position on the course. Then, when the intersection is approached, the intersection is displayed, as described earlier.

An example of processing in accordance with the method of displaying a departure intersection in the navigation apparatus of the invention will be described. Before describing this processing, however, an example of the structure of the data prepared in the navigation apparatus of the invention will explained.

FIG. 9 shows examples of the structure of the road network and intersection data, road data and node series data.

Figure 9A:
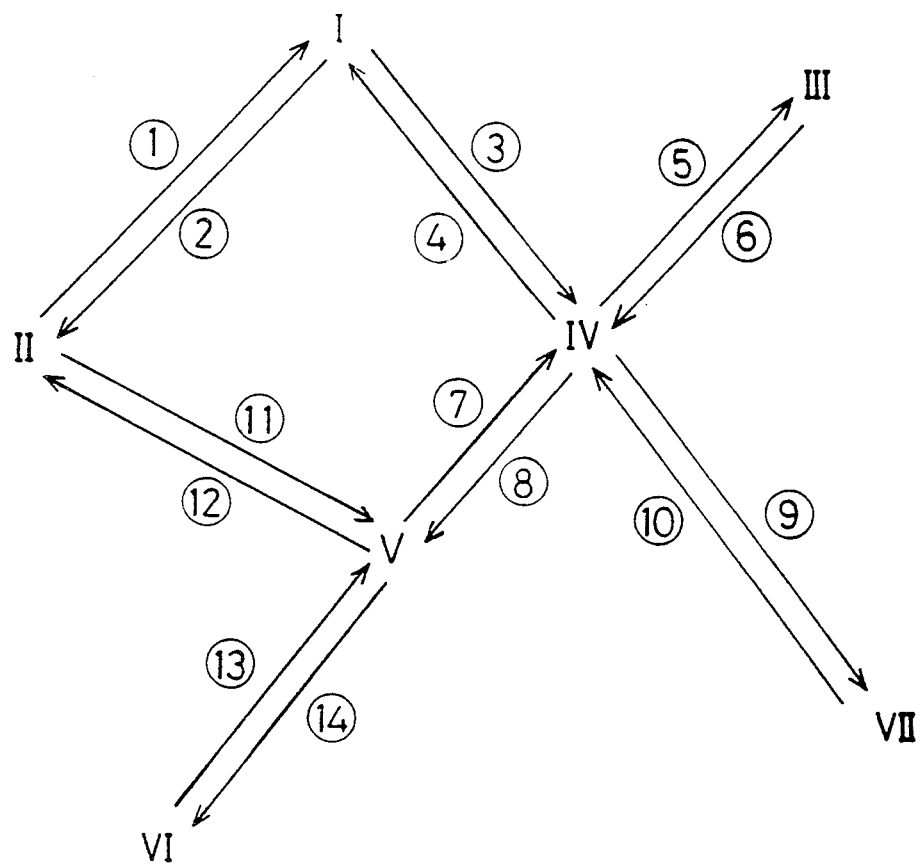

In case of a road network comprising intersection numbers I–VII and road numbers ①–⑭, as shown for example in FIG. 9(a), the intersection data will have a data configuration of the kind shown in (b) of FIG. 9, the road data a data configuration of the kind shown in (c), the node data a configuration of the kind shown in (d), the intersection landmark data a configuration of the kind shown in (e), and the landmark pattern data a configuration of the kind shown in (f).

As shown in (b) of FIG. 9, the intersection data possess information arranged to correspond to the intersection numbers I–VII, namely information relating to at least a road number which is the smallest of those of roads having the particular intersection as a starting point, a road number which is the smallest of those of roads having the particular intersection as an end point, the position (east longitude, north latitude) of the particular intersection, the name of the intersection and a landmark pointer.

As shown in (c) of FIG. 9, the road data possess information arranged to correspond to the road numbers ①–⑭, namely information relating to at least a road number which is the next of those having the same starting point, a road number which is the next of those having the same end point, starting and end points based on intersection number, a node series pointer, and road length. As will be evident from the figure, a road number which is the next of those having the same starting point and a road number which is the next of those having the same end point can be generated by retrieving the same numbers from the starting and end points based on the intersection number. Also, road length can be obtained by adding the position information of the next node series data.

As shown in (d) of FIG. 9, the node series data possesses information relating to the number of nodes, which is placed at a leading position pointed out by the node series pointer of the road data, as well as node positions (east longitude and north latitude) regarding the nodes corresponding to the number thereof. In other words, a node series is arranged for each item of road data. The illustrated example indicates the node series of road numbers ① and ②.

The intersection landmark data possesses information relating to the number of landmarks, lankmark number and coordinates (east longitude and north latitude) of the center of the landmark. The landmark pointer of the intersection data points to the address of this data. The landmark pattern data of the landmark numbers in (f) of the figure store patterns of gasoline stands, schools, banks and other landmark patterns.

It will be evident from the structure of the foregoing data that a road number unit comprises a plurality of nodes. That is, the node series data represent a collection of data relating to one geographical point on a road. Letting a line connecting two nodes be referred to as an arc, a road is expressed by interconnecting a plurality of node series by arcs. For example, with regard to road number ①, A000 of the node series data can be accessed from the node series pointer of the road data, and thus it can be understood that the road number ① is composed of 15 nodes.

Take intersection number V as an example. For a course having this intersection as a starting point, first road number ⑦ is retrieved from the information relating to the road leaving the intersection, then road number 12 is retrieved from the information "NO. OF NEXT ROAD HAVING SAME STARTING POINT". Road number ⑭ is retrieved from similar information relating to road number ⑫, and then road number ⑦ is retrieved. Since road number ⑦ is the road number started with above, it can be determined that there are no other road numbers available as peripheral roads. The same will hold true with regard to end points. If the intersection data and road data are used in this way, the numbers of roads entering and exiting each intersection can be retrieved and the lengths of routes connecting intersections can be obtained. By providing these data with travelling conditions such as roads that cannot be entered, illegal turns and road width, the result is information which will enable course search, described below, to be performed in great detail.

The flow of overall processing in a navigation apparatus to which the invention is applied will now be described.

Figure 10:
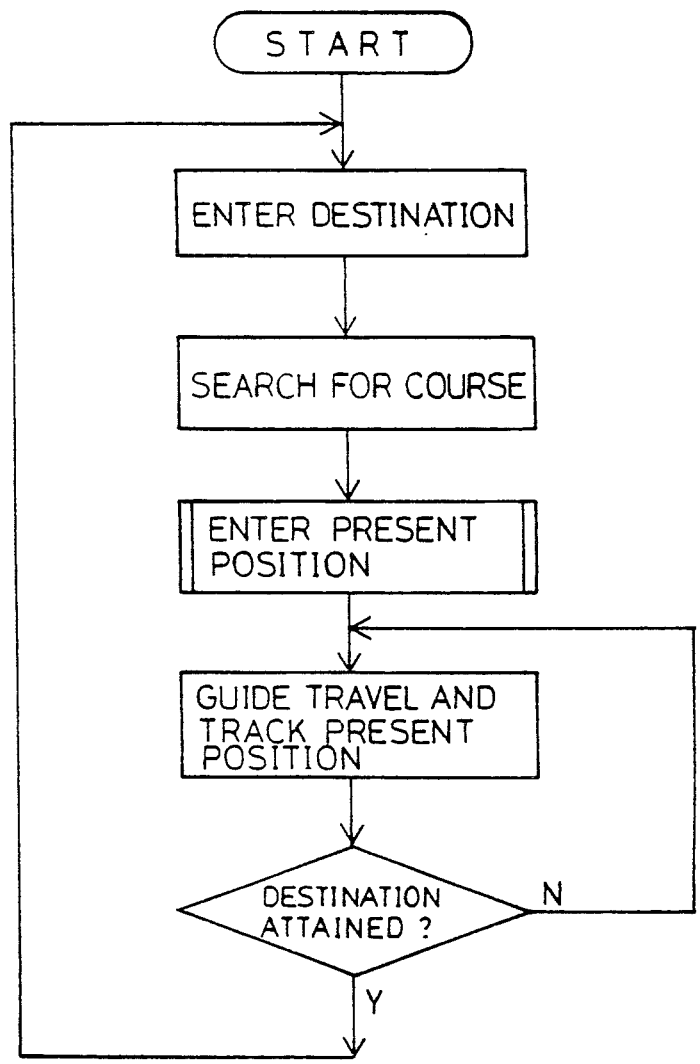
FIG. 10 is a view for describing the flow of all processing performed by the navigation apparatus to which the embodiment is applied.
Figure 11:
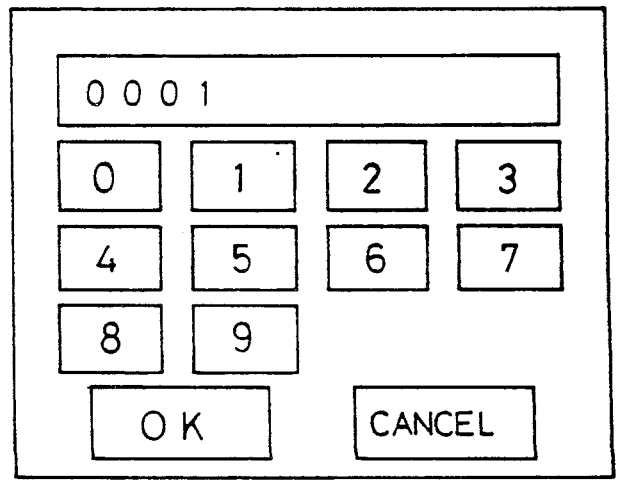
FIG. 11 is a view showing an example of a menu screen for destination input.

In FIG. 10, destination is entered first. By displaying a menu screen of the kind shown in FIG. 11, by way of example, the code ("0001") of the destination is entered by touching a numerical section serving as a ten-key pad.

Figures 12A, 12B:
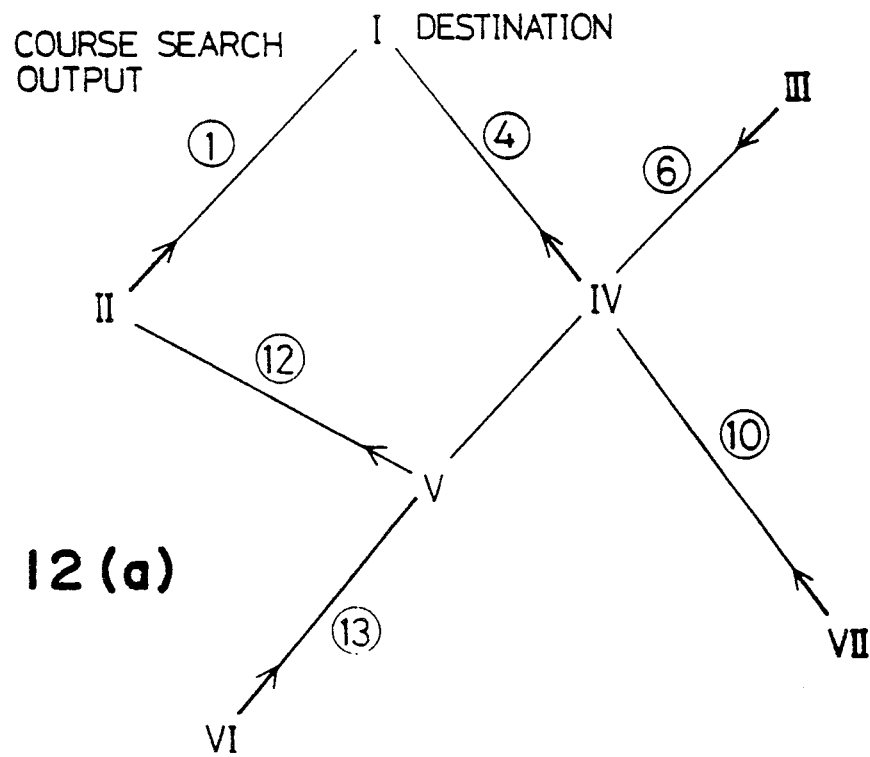
FIGS. 12a-12b are views for describing an example of course search output.

Next, a transition is made to a course search mode, in which optimum course directions to each and every intersection are set. For example, as shown in FIG. 9(a), if intersection I is the destination, directions of travel to the destination are set for each of the intersections II-–VII, as illustrated in FIG. 12(a). FIG. 12(b) shows an example of the data. In accordance with this course search, direction of travel at each intersection is set by successively obtaining, starting from the intersection nearest the destination, the direction that will give the shortest distance to the destination, by way of example. Processing for entry of present position, which is the departure point, is performed next.

Figure 13:
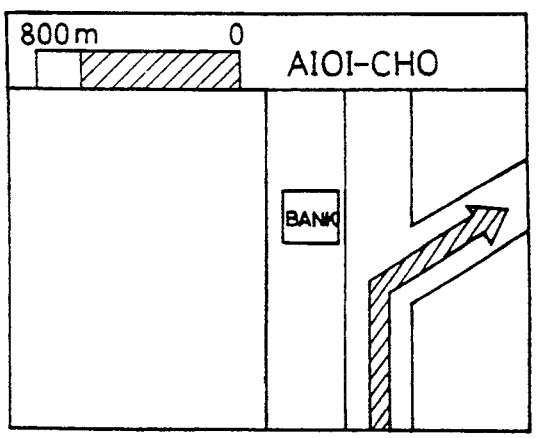
FIG. 13 is a view illustrating an example of guidance output.

When processing for entering present position is carried out, guidance for direction of travel from this position is possible by the display of the kind shown in FIG. 13. Signals from the distance sensor and steering angle sensor are processed to keep track of present position in accordance with vehicle travel until the destination is reached.

Figure 14:
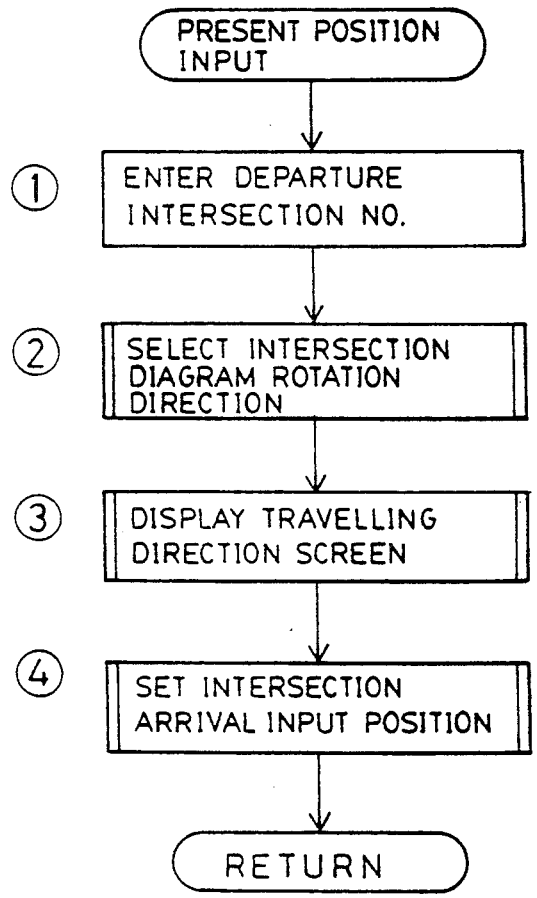
FIG. 14 is a view showing a present position input processing routine.

The present position input processing routine is as shown in FIG. 14.

① , ② When the number of the intersection of departure is entered, processing is performed for selecting the direction of rotation of the intersection diagram. Intersection orientation, shape, name and intersection landmarks are identified from the intersection data, road data and nose series data described earlier, whereupon an intersection diagram of the kind shown in FIGS. 7(a), (b) and (c) is displayed.

Figure 15:
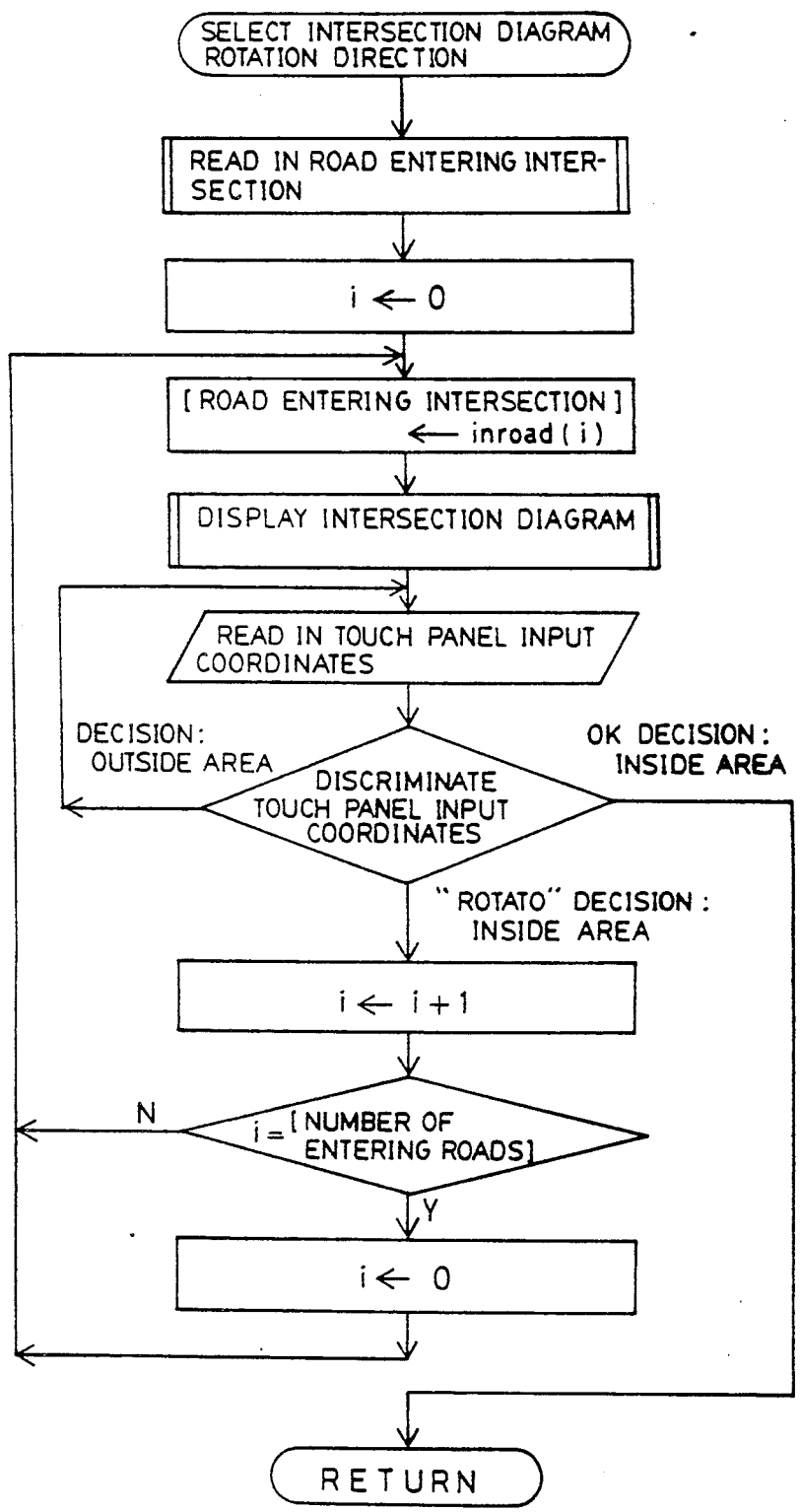
FIG. 15 is a view showing a processing routine for selecting a direction in which an intersection diagram is rotated.

As regards selecting the direction of rotation of the intersection diagram, first a road entering the intersection is read in from the intersection data and road data, as shown in FIG. 15, a loop counter i is set to 0, and a road corresponding to the value of i is adopted as the road entering the intersection while i is incremented. The intersection diagram is displayed upon rotating it in such a manner that this incoming road will be placed below the intersection. A transition is then made to a mode for reading in touch panel input coordinates, and decision processing regarding the touch panel input coordinates is executed to determine whether the touch panel area is a "ROTATION" area, "OK" area or some other area. If the area if the "ROTATION" area, the loop counter i is incremented and display of the intersection diagram is repeated until the value thereof attains the number of roads entering the intersection. When the value of the loop counter i attains the number of roads entering the intersection, the loop counter i is set to 0 again and the same processing is executed.

Figure 16:
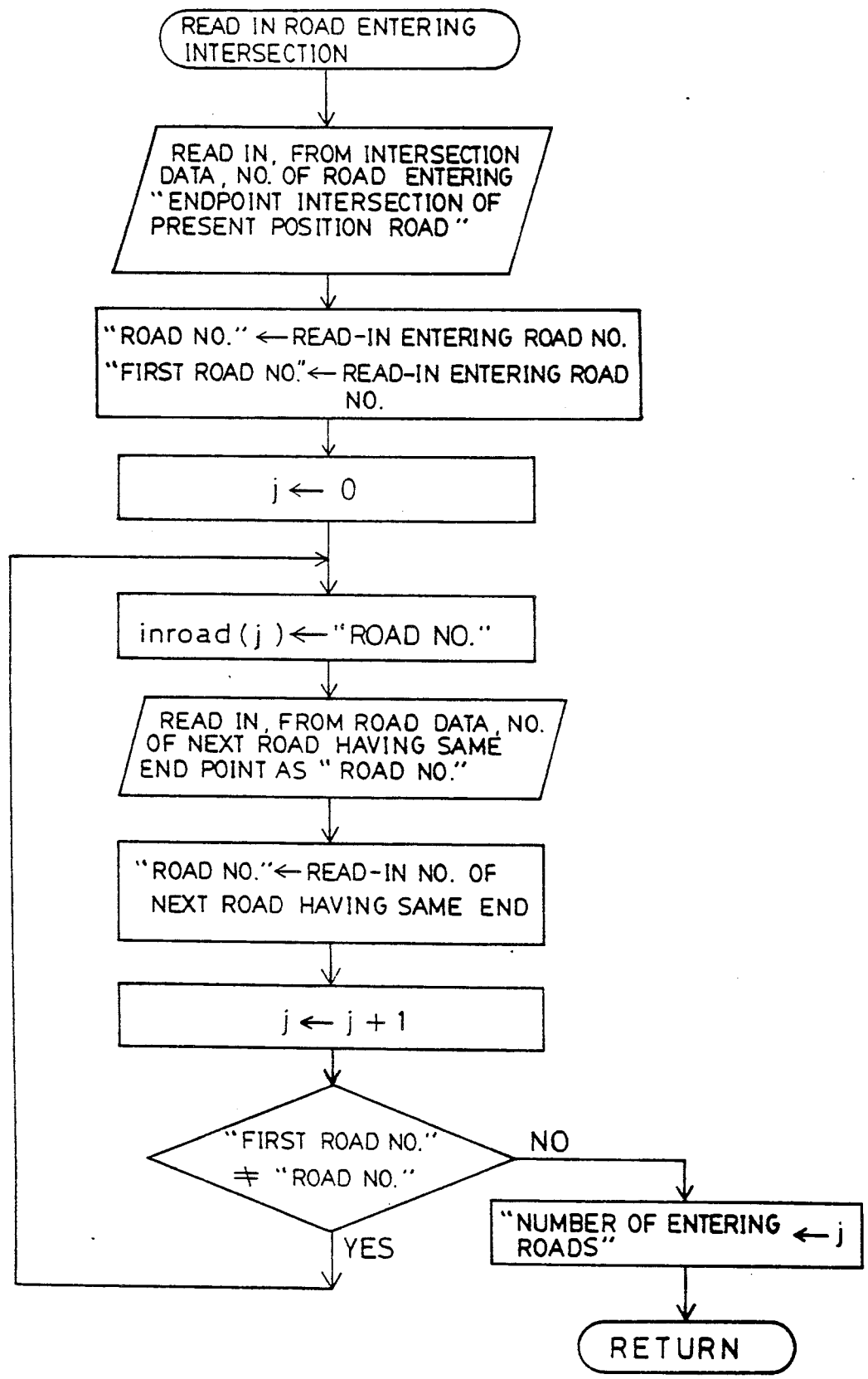
FIG. 16 is a view showing a processing routine for reading in a road entering an intersection.

With regard to reading in roads entering an intersection, as shown in FIG. 16, first the numbers of roads entering an intersection at the end point of the road on which the present position is located are read in from the intersection data, the respective road numbers are set to "ROAD NO." and "INITIAL ROAD NO.", and the loop counter j is set to 0. The number of the next road having the same starting point is read out successively from the road data, while the loop counter j is incremented, until the "INITIAL ROAD NO." is attained. When all road numbers have been read out and the "INITIAL ROAD NO." attained, the number of road is set as the "NUMBER OF ENTERING ROADS".

③ The intersection map is rotated by the rotation designation key in such a manner that the road leading to the intersection is placed at the bottom of the screen, and the confirmation key is pressed. When this is done, the road for the travelling direction is displayed in the form of an arrow, as shown in FIG. 7(d).

Figure 17:
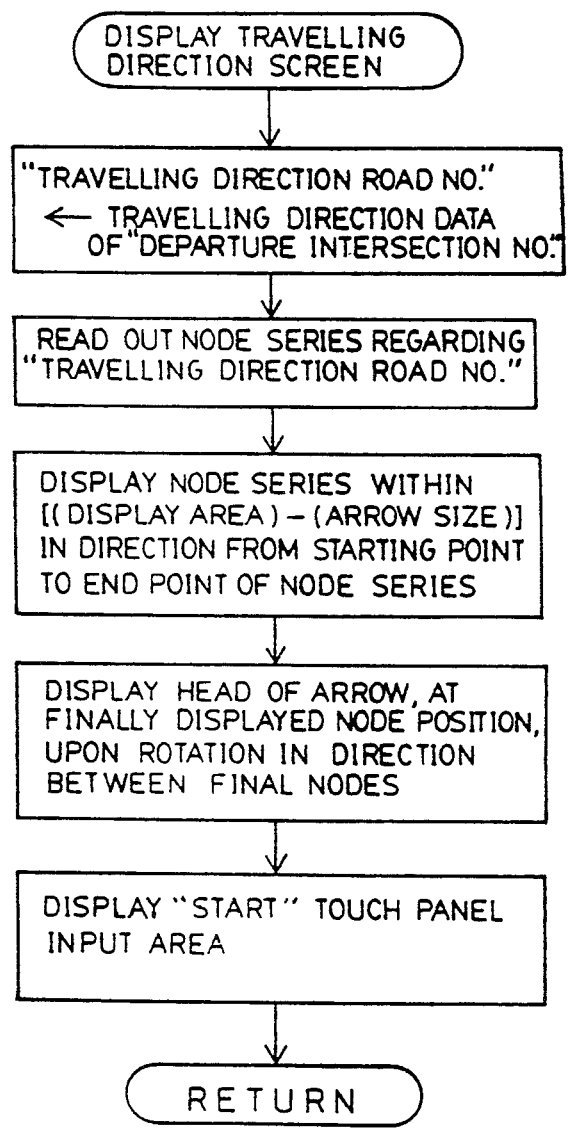
FIG. 17 is a view showing a processing routine for for displaying a direction of travel.
Figure 18:
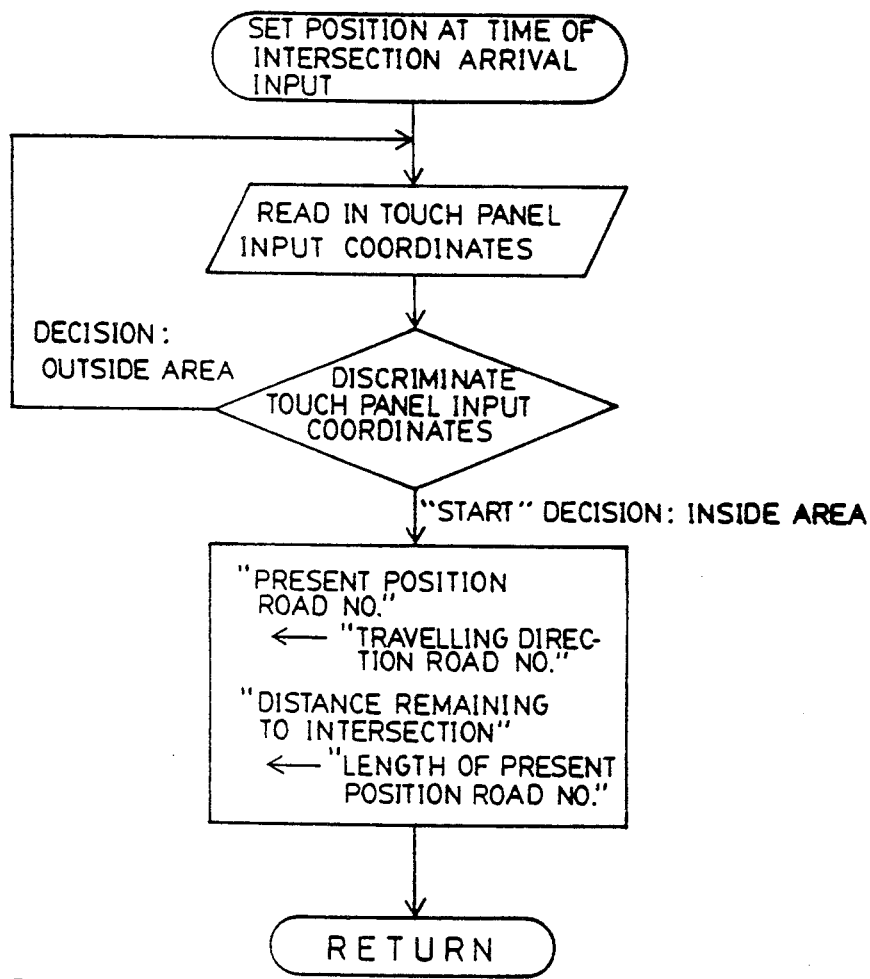
FIG. 18 is a view showing a processing routine for setting an intersection arrival input position.

In displaying the direction of travel, the travel direction data [FIG. 12(b)] for the departure intersection number is made the travel direction road number and the node series of this road number is read out, as shown in FIG. 17. A node series, which is obtained by subtracting the size of the arrow from the boundary line of the display area, is displayed in the direction from the starting point to the end point of the node series. The head of the arrow mark is painted, with its head rotated in the abovementioned direction, at the finally displayed node position. Thereafter, the "START" touch panel input area is displayed.

④ After the foregoing, the system waits until there is a start input. When the driver makes a start input at the time the vehicle passes through an intersection, processing is executed for setting the intersection arrival input position, and processing starts for travel guidance and tracking of present position.

As regards the processing for setting the intersection arrival input position, the touch panel input coordinates are read in, as shown in FIG. 12, the travel direction road number is set as the present-position road number, and the length of the present-position road number is set as the distance remaining to the intersection.

Processing for displaying an intersection diagram using the abovementioned map data will be described in further detail.

Figure 19:
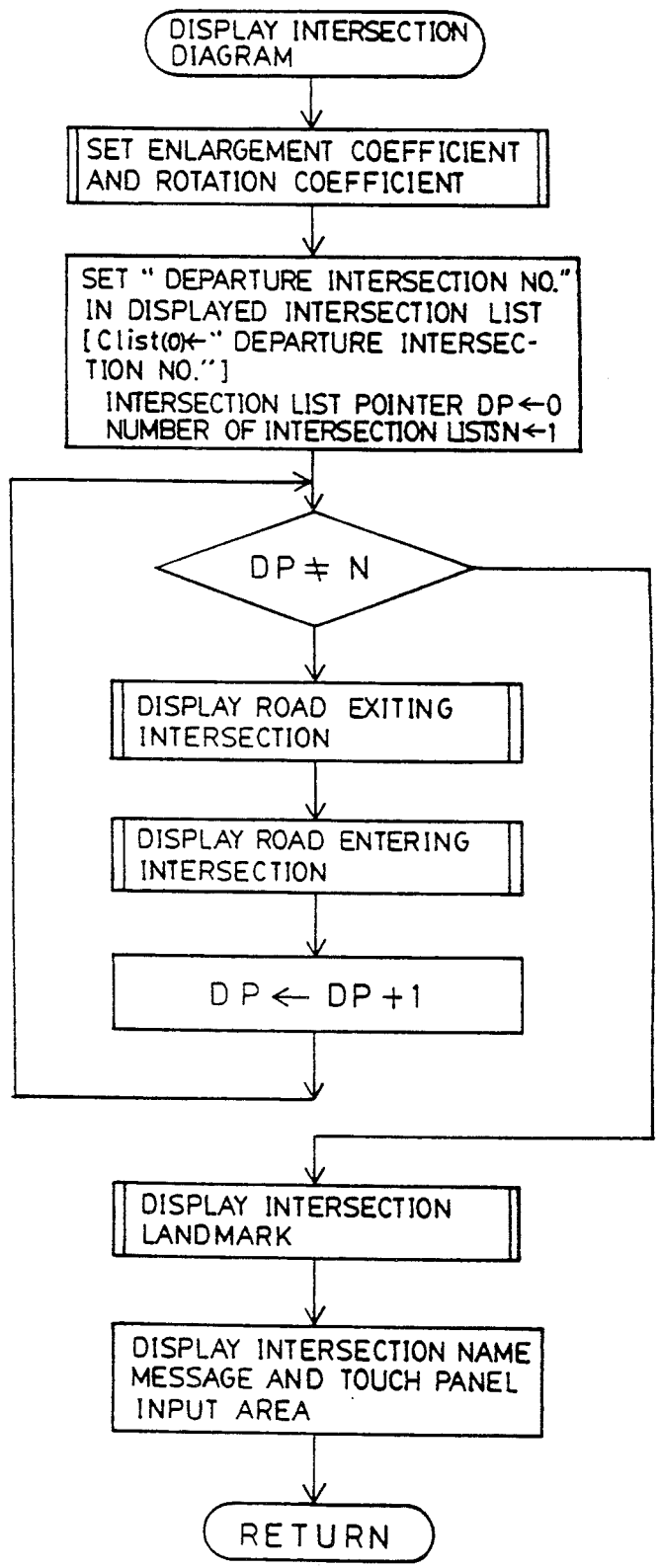
FIG. 19 is a view showing a processing routine for displaying an intersection diagram.

As shown in FIG. 19, displaying an intersection diagram entails setting a rotation coefficient in order to display the intersection with the direction of travel pointing upward, and setting an enlargement coefficient in order to enlarge the map coordinates to the display coordinates in such a manner that the range of the display becomes, e.g., 200 m². Next, the departure intersection number is set in a display coordinate list clist, an intersection list pointer DP is made 0, and a number N of coordinate lists is made 1. All roads leaving and entering an intersection are displayed, after which intersection landmarks, intersection name, messages and touch panel input area are displayed.

Figure 20:
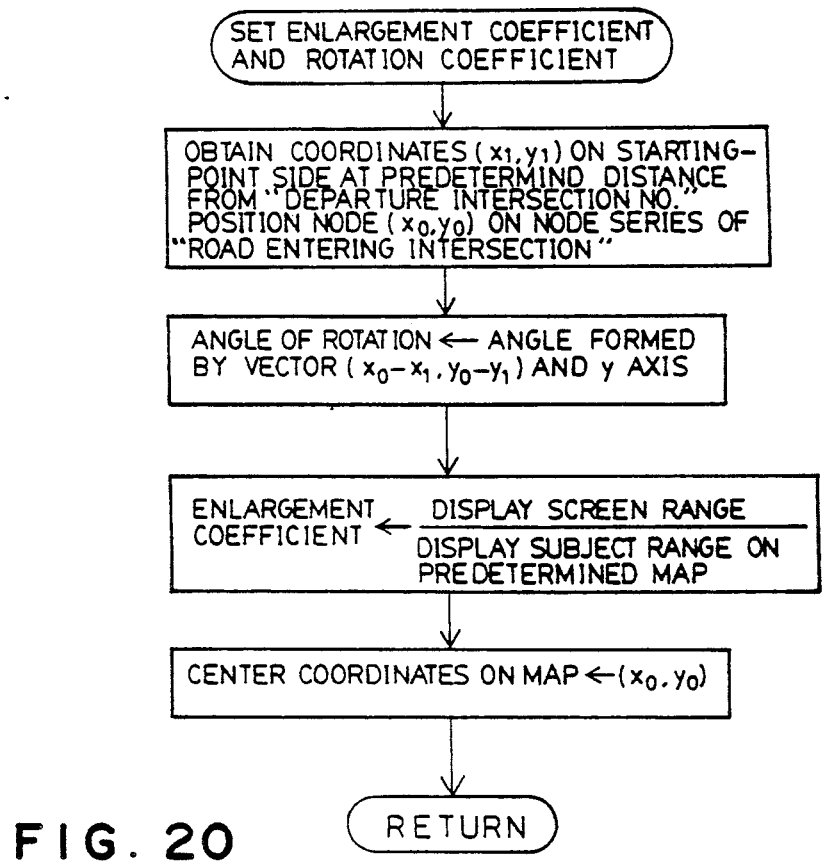
FIG. 20 is a view showing a processing routine for setting an enlargement coefficient and rotation coefficient.
Figure 21:
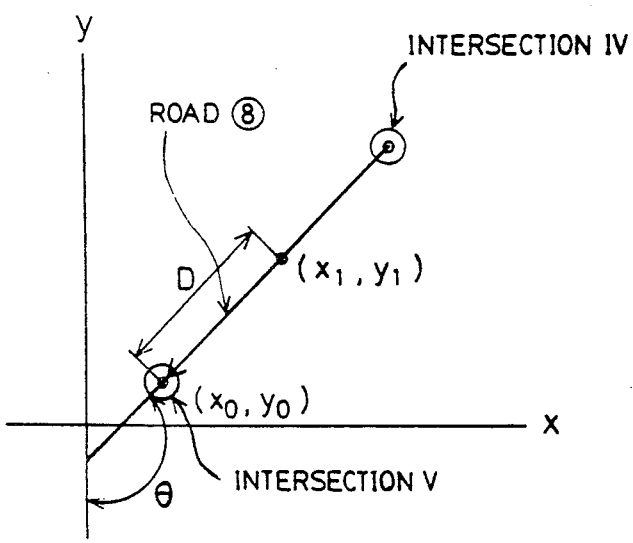
FIG. 21 is a view for describing a method of setting a rotation coefficient.

As illustrated in FIG. 20, setting enlargement and rotation coefficients entails finding coordinates $(x_1, y_1)$, which are obtained by returning a predetermined distance D, toward the starting-point side, from the coordinates $(x_o, y_o)$ of the node of the departure coordinate point position on the node series of the road leading to the intersection, and finding an angle $\theta$, namely the rotation coefficient, defined by the y axis and a straight line (vector) connecting two points. For example, let the intersection V of the road network shown in FIG. 9(a) be the departure intersection, and let the road leading to the intersection be ⑧. In such case, the distance D and angle $\theta$ defined by the vector and y axis will be as shown in FIG. 21. Further, the enlargement coefficient is obtained by the formula [display screen range (number of dots on display screen)]/[display subject range on predetermined map (seconds)], and the coordinates $(x_o, y_o)$ of the node of the departure intersection position are adopted as the coordinates of the center of the map.

Figure 22:
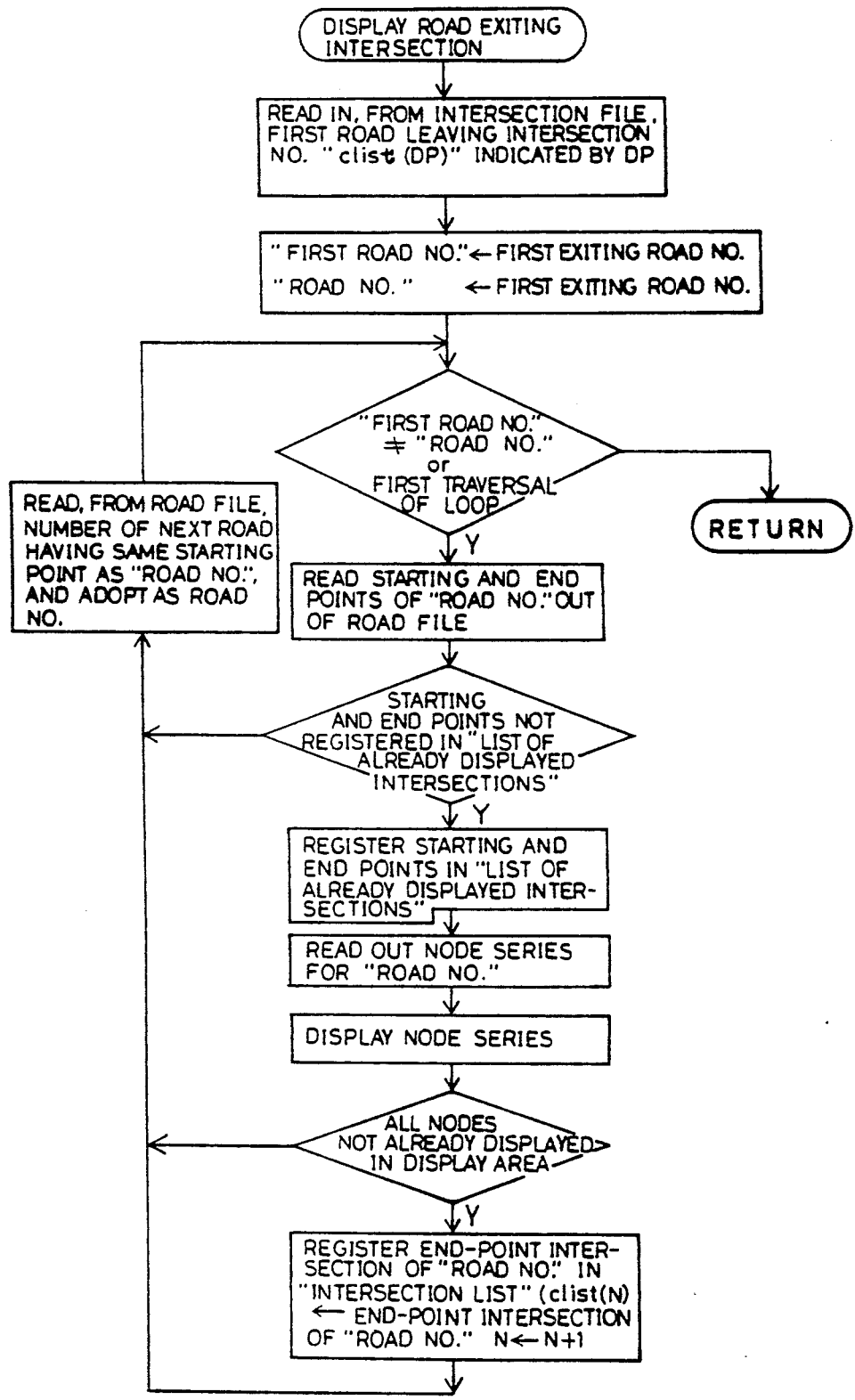
FIG. 22 is a view showing a processing routine for displaying a road leaving an intersection.

As shown in FIG. 22, displaying a road leaving an intersection entails reading in, from the intersection data, the number of the first outgoing road at an intersection number on a display intersection list clist pointed out by the intersection list pointer DP, and making this road number the first road number and a road number. The starting-point intersection and end-point intersection of this road number are read out. Next, it is determined whether the starting-point intersection and end-point intersection have been registered in a list of already displayed intersections. If they have not been registered, the the starting-point intersection and end-point intersection are registered in the list of already displayed intersections. Thereafter, the node series for the road number is read out and the node series is displayed upon being converted into display screen coordinates using the abovementioned rotation coefficient and enlargement coefficient. When all nodes within the display area have already been displayed, the end-point intersection of the road number is registered in the intersection list and the number N of intersection lists is incremented. This is followed by reading out, from the road data, the number of the next road having the same starting point, and similar processing is repeatedly executed until the painting of all outgoing roads ends (until the round of road numbers is made the number returns to the initial road number).

Accordingly, if, by way of example, the intersection IV falls within the display area in a case where the departure intersection is V and the intersection V is taken as the center coordinates of the map, then, in accordance with the processing shown in FIG. 19, first V will be set in the intersection list. Then, in the processing shown in FIG. 22, road number ⑦ is read out and IV, V are registered in the list of already displayed intersections. Since the entire node series of road number ⑦ lies within the display area, the entire node series is displayed, IV is registered in the intersection list and the number N of intersection lists is incremented to b 2. In other words, the intersection list, intersection list pointer and intersection list number N change as follows:

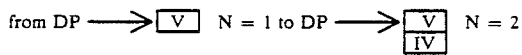

and the following is registered in the list of already displayed intersections:

| end-point intersection | starting-point intersection |
|---|---|
| V | IV |

Next, when road numbers ⑫, ⑭ are displayed, all nodes of these roads cannot be displayed within the display area. Therefore, the list of already displayed intersections only is additionally registered in the following manner:

| end-point intersection | starting-point intersection |
|---|---|
| IV | V |
| II | V |
| VI | V |

If all nodes even for these can be displayed within the display area, II, IV are additionally registered in the intersection list and the number of intersection lists is updated to 3.

Figure 23:
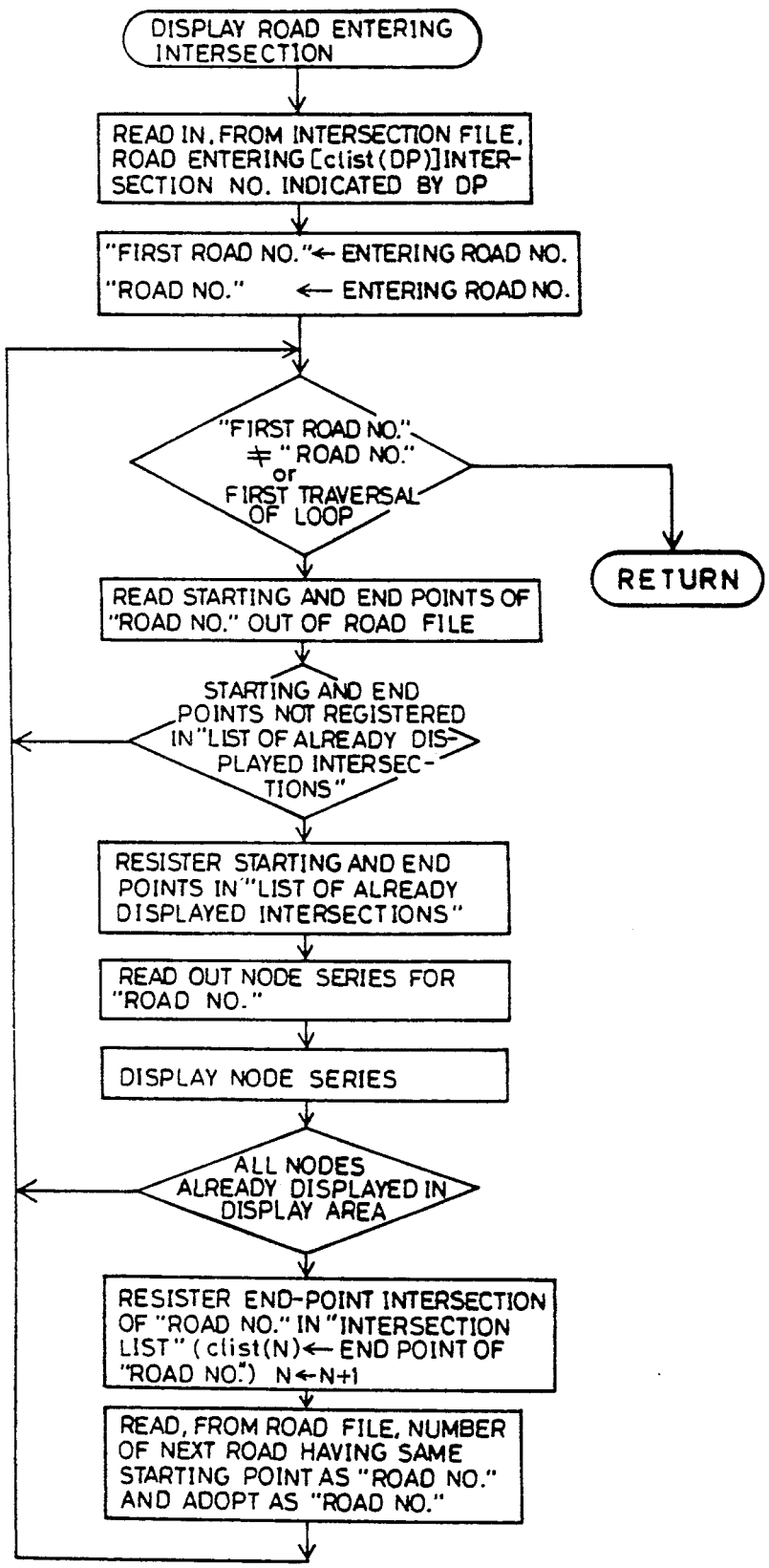
FIG. 23 is a view showing a processing routine for displaying a road entering an intersection.

As illustrated in FIG. 23, displaying roads entering an intersection, which is performed following the displaying of roads leaving an intersection, is carried out by processing almost the same as that of FIG. 22. According to this processing, display of redundant roads is excluded from the list of already displayed intersections already registered by displaying the roads leaving the intersection. In the case of the road network shown in FIG. 9(a), the exiting and entering roads are in pairs, so that there is no road which can be the subject of a display showing a road entering an intersection.

Figure 24:
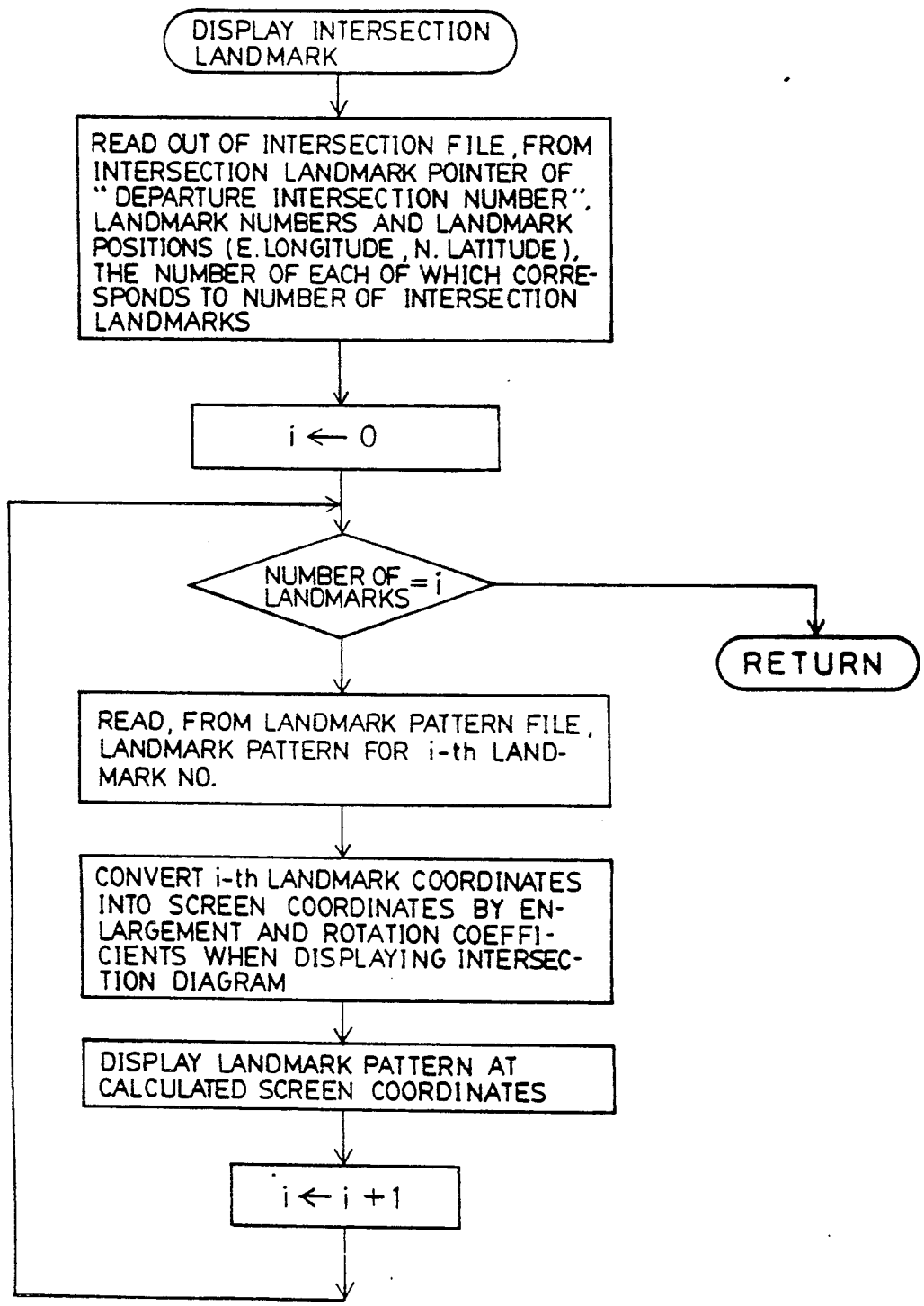
FIG. 24 is a view showing a processing routine for displaying intersection landmarks.

As shown in FIG. 24, displaying intersection landmarks entails first reading out, from the intersection landmark pointers (FIG. 9) of the departure intersection, landmark pattern numbers and landmark positions, the number of which correspond to the number of landmarks in the intersection landmark data. The landmark pattern for the i-th landmark number is read out of the landmark pattern data (FIG. 9), the coordinates of the i-th landmark are transformed into display screen coordinates by the enlargement and rotation coefficients that prevail when the intersection diagram is displayed, and the landmark pattern is displayed at the calculated screen coordinates.

The present invention is not limited to the foregoing embodiments but can be modified in various ways.

For example, in the foregoing embodiment, road network data of the kind shown in FIG. 9 is provided as basic data and an intersection diagram is displayed based on these data. However, an arrangement can be adopted in which the intersection diagrams are provided in advance and these are selectively read out, rotated and displayed, or in which intersection diagrams for respective ones of the angles of rotation are provided in advance, and corresponding intersection diagrams are selected and displayed without performing a coordinate transformation by a rotation instruction. It is also possible to provide intersection diagrams as image data. It goes without saying that the navigation apparatus can be applied to a system in which, rather than data for the direction of travel to a destination being provided at each intersection, as in the foregoing embodiments, a course from the departure point to the destination is set and travel guidance is afforded along the course, a system in which course travel guidance screens are provided in advance and successively outputted in a predetermined sequence, and other systems as well.

Further, in the foregoing embodiments, intersection diagrams are rotated by operating a rotation instruction key. However, it can be so arranged that, by touching a displayed road the road is selected and rotated to appear below the intersection diagram is touched, the road nearest the coordinates of the position touched is recognized as being an incoming road and the rotation coefficient is found. Alternatively, processing is performed in such a manner that, by operating the rotation instruction key, a road is selected in a predetermined sequence and made to appear at bottom of the screen. However, an arrangement can be adopted in which rotation through a fixed angle is applied, irrespective of the road, by operating the rotation instruction key, or in which the angle of rotation is enlarged, or enlarged in a gradual manner, when the touch input is made in excess of a fixed period of time, by way of example, in correspondence with the operation time of the rotation instruction key.

Yet another embodiment of the invention will now be described.

Figure 25:
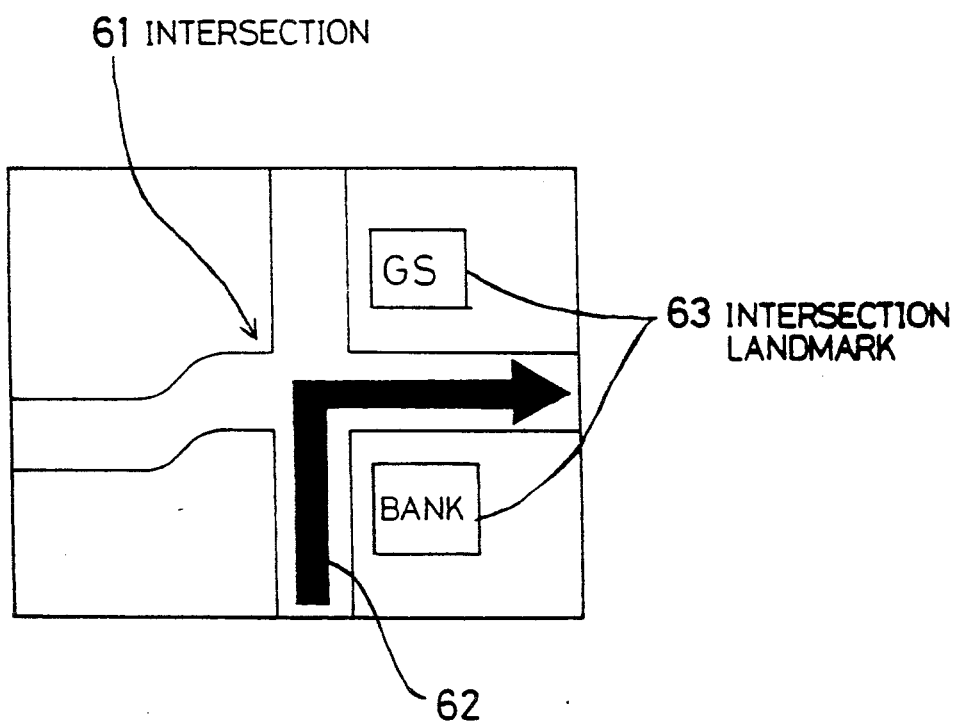
FIG. 25 is a view for describing yet another embodiment of a display system in a navigation apparatus according to the present invention.

The system configuration of the navigation apparatus used in this embodiment is similar to that of FIG. 8 employed in the above-described embodiment, by way of example. Accordingly, the description thereof is deleted. FIG. 25 illustrates a display screen outputted in this embodiment. In this display, the direction of travel to an intersection 61 is presented so as to be vertical, and an arrow 62 in the direction of a turn and intersection landmarks 63, which are a gasoline station and a bank, are displayed.

The display method for outputting the above-mentioned screen will be described. Discussed first with reference to FIGS. 26 through 31 will be the structure of the data.

Figures 26, 27:
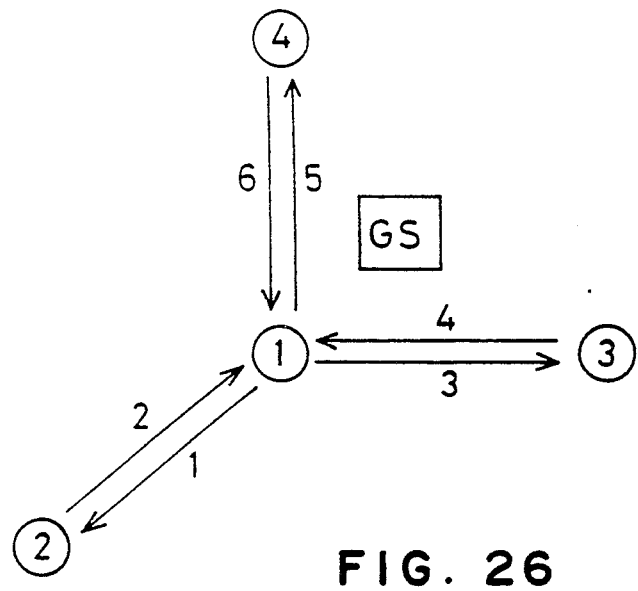
FIG. 26 is a view showing an example of an intersection.
FIG. 27 is a view showing intersection number data.

FIG. 26 illustrates an intersection ① connected to intersections ②-④. An example in which a map of the vicinity of intersection ① and an intersection landmark GS (gasoline station) are displayed will be described. The roads connecting the intersection ① with the intersections ②-④ are assignee road numbers 1-6 so as to indicate exiting and entering roads.

FIG. 27 illustrates the contents of the abovementioned intersection number data. Positional coordinates of east longitude and west latitude are set for each intersection number. Also set for each intersection, based on the relationships shown in FIG. 26, are the smallest road numbers of the roads entering and exiting the intersection, the number of roads exiting and the number of roads entering. An intersection landmark pointer indicates the leading address at which the pertinent intersection landmark data are stored in memory.

Figures 28, 29, 30:
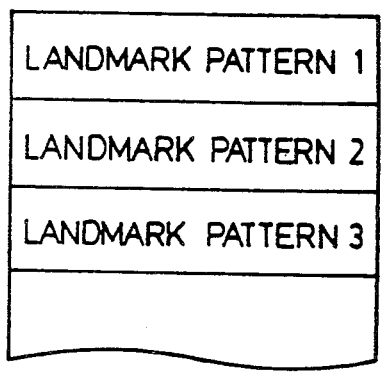
FIG. 28 is a view showing road number data.
FIG. 29 is a view showing intersection landmark data.
FIG. 30 is a view showing landmark patterns.

FIG. 28 illustrates the contents of the abovementioned road number data. Set with regard to each road number, based on the relationships shown in FIG. 26, are starting- and end-point intersection numbers, the number of a road having the same starting point, and the number of a road having the same end point. The node series pointer indicates the memory address having the first node of the node series on the road. The node series indicates the coordinates of a plurality of positions arrayed along the road.

FIG. 29 illustrates the contents of the intersection landmark data. The number of landmarks, the coordinates (east longitude, north latitude) of the position of the center of the landmark, and the landmark pattern number are stored with regard to the intersection landmark pointer designated in FIG. 27.

FIG. 30 illustrates a file of the landmark pattern numbers, in which image data indicative of banks, gasoline stations and the like are stored, in the form of 24×24 dot matrix data, for every landmark pattern number The image data can be arranged to have character codes.

Figure 31:
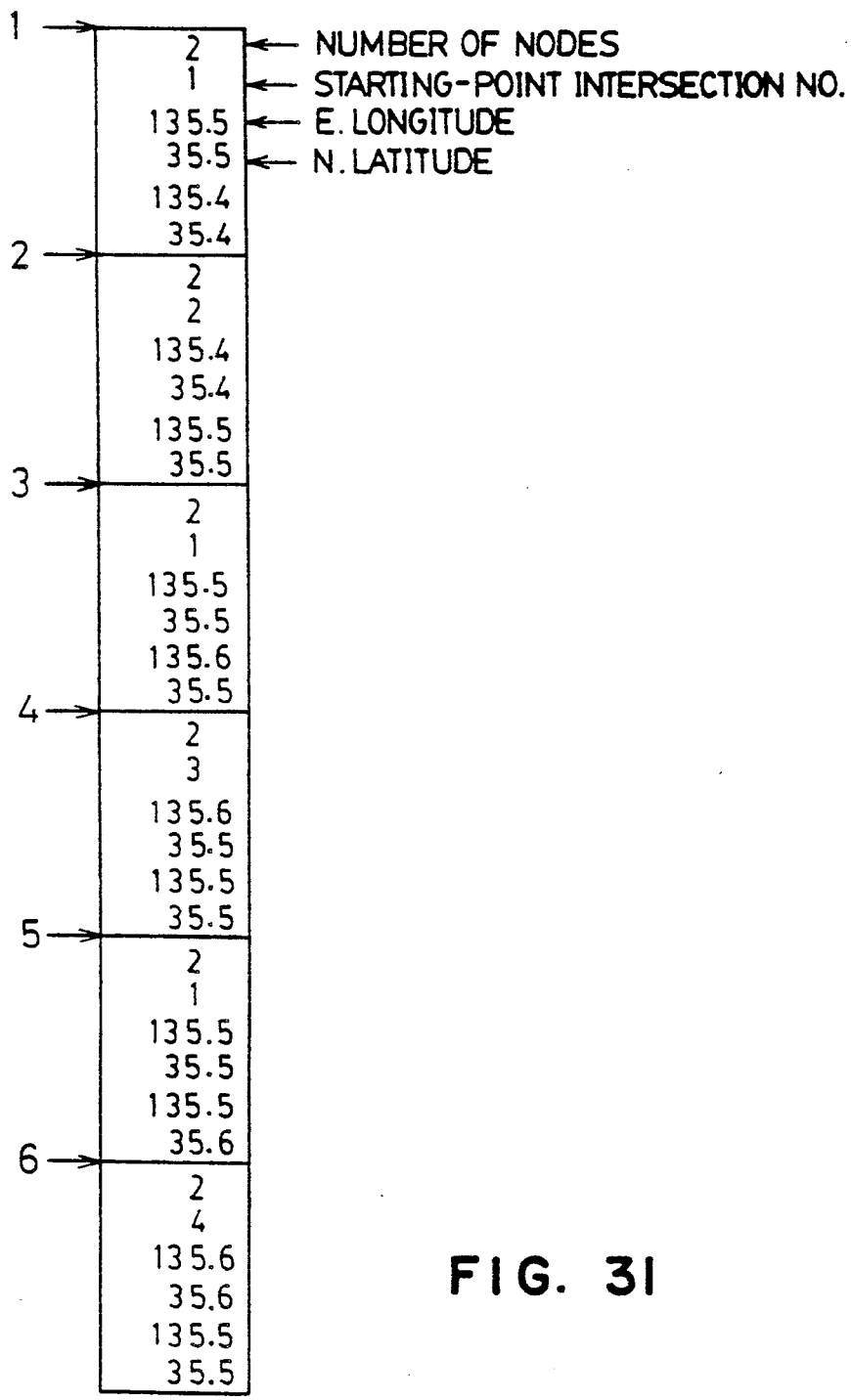
FIG. 31 is a view showing node series data.

FIG. 31 illustrates map data and shows node series data corresponding to each road number designated by the node series pointer of FIG. 28. Numbers of nodes and coordinates (east longitude, north latitude) of node series are stored in the order of the road numbers.

A method of displaying intersections using the abovementioned road data and map data will now be described.

Figure 32:
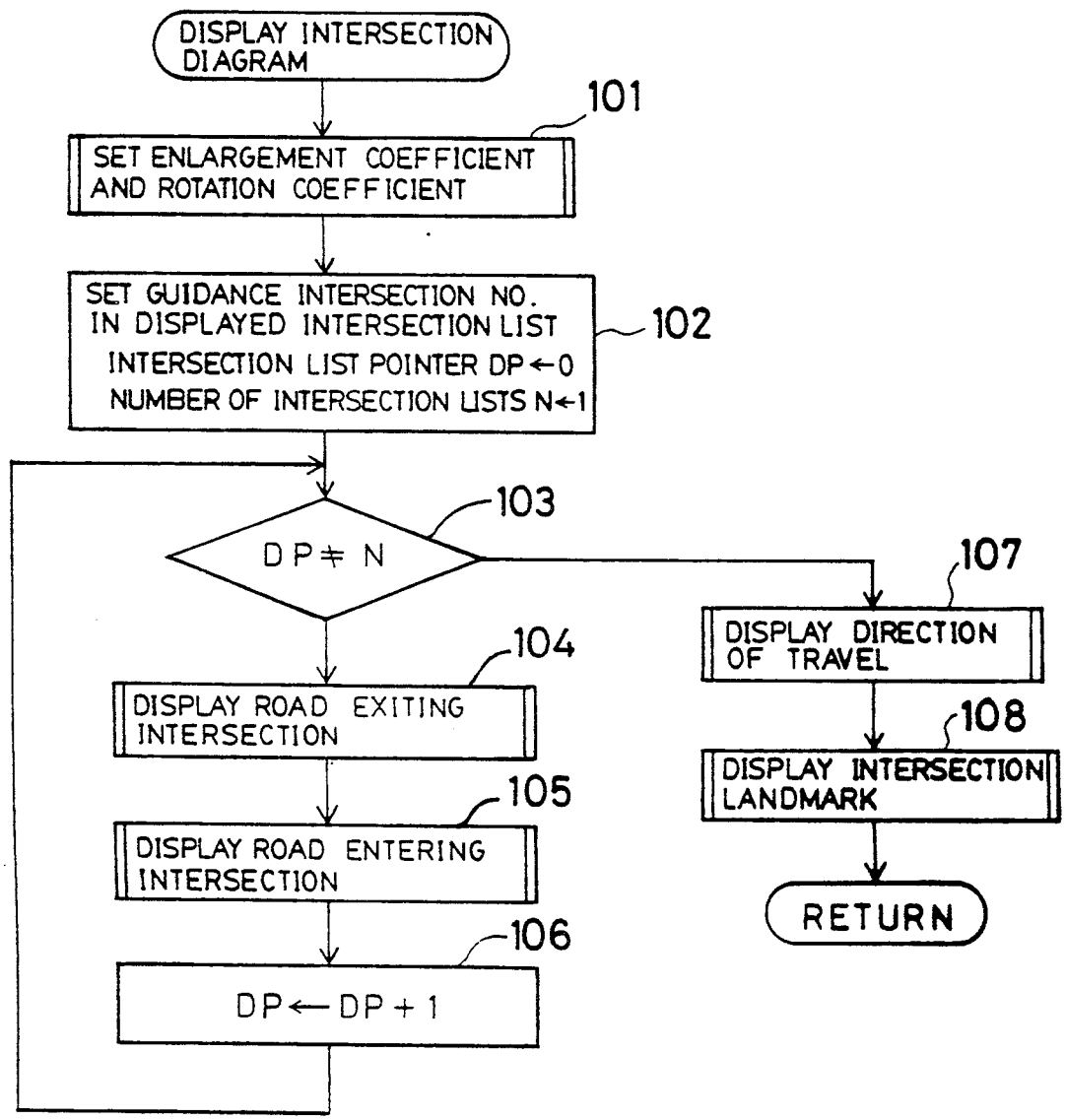
FIG. 32 is a flowchart for displaying an intersection diagram.

At step 101 in FIG. 32, a rotation coefficient is set in order to display an intersection with the direction of travel pointed upward, and an enlargement coefficient is set in order to effect an enlargement from map coordinates to display screen coordinates in such a manner that the display range becomes, e.g., 200 m². At step 102, guidance intersection numbers are set in the display intersection list, the intersection list pointer DP is made 0, and the number N of intersection lists is made 1. Next, at steps 103-106, roads entering and exiting the intersection are displayed, an arrow indicating the direction of travel is displayed at step 107, and the intersection landmark is displayed at step 108.

In the following description, a case will be discussed in which guidance is provided for intersection ②, guidance intersection ① and intersection ③ in FIG. 26.

Figure 33:
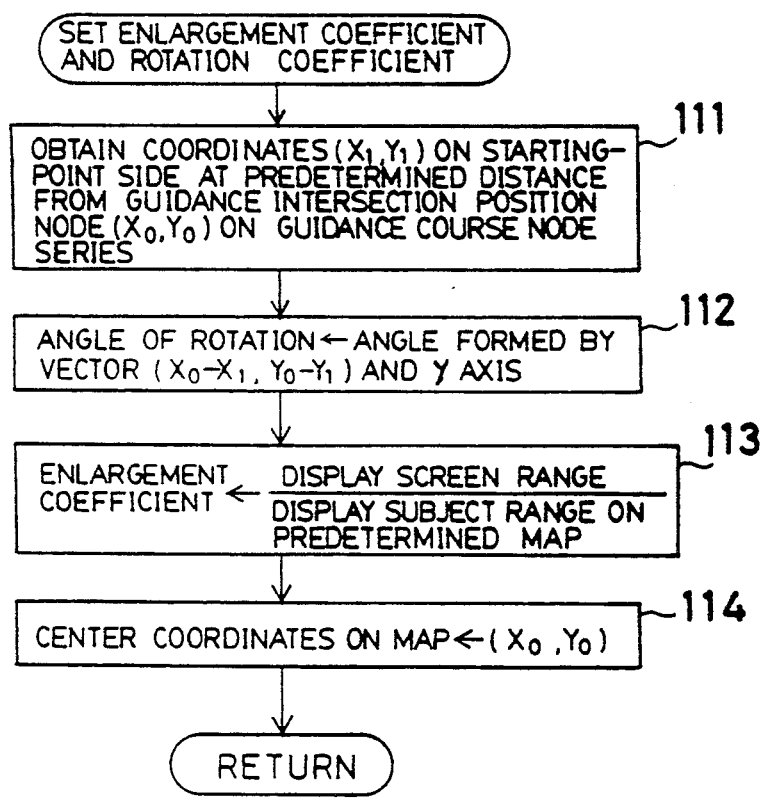
FIG. 33 is a flowchart for setting display enlargement and rotation coefficients.
Figure 34:
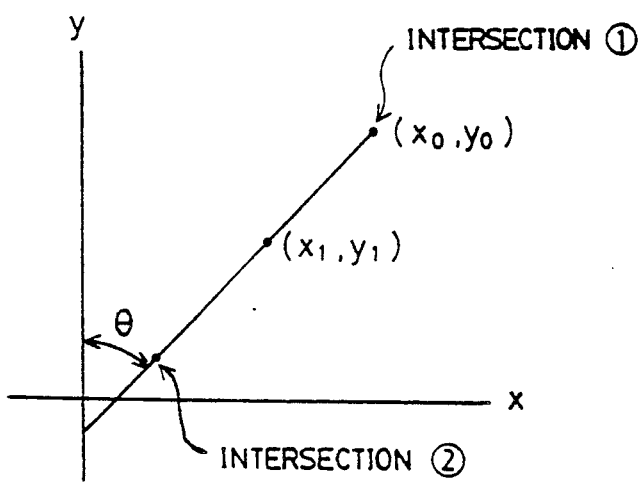
FIG. 34 is a view for describing the effects thereof.

FIG. 33 illustrates the flow of processing for setting the enlargement and rotation coefficients of step 101. This entails finding, at step 111, coordinates $(x_1, y_1)$, which are a predetermined distance, on the the starting-point side, from the coordinates $(x_o, y_o)$ of the node of the guidance intersection position on the guidance course node series, and adopting an angle $\theta$ (FIG. 34), which is defined by the y axis and a straight line connecting two points, as an angle of rotation at step 122. The enlargement coefficient is obtained at step 113 by the formula [display screen range (number of dots on display screen)]/[display subject range on predetermined map (seconds)], and the coordinates $(x_o, y_o)$ of the node of the guidance intersection position are adopted as the coordinates of the center of the map.

Figure 35:
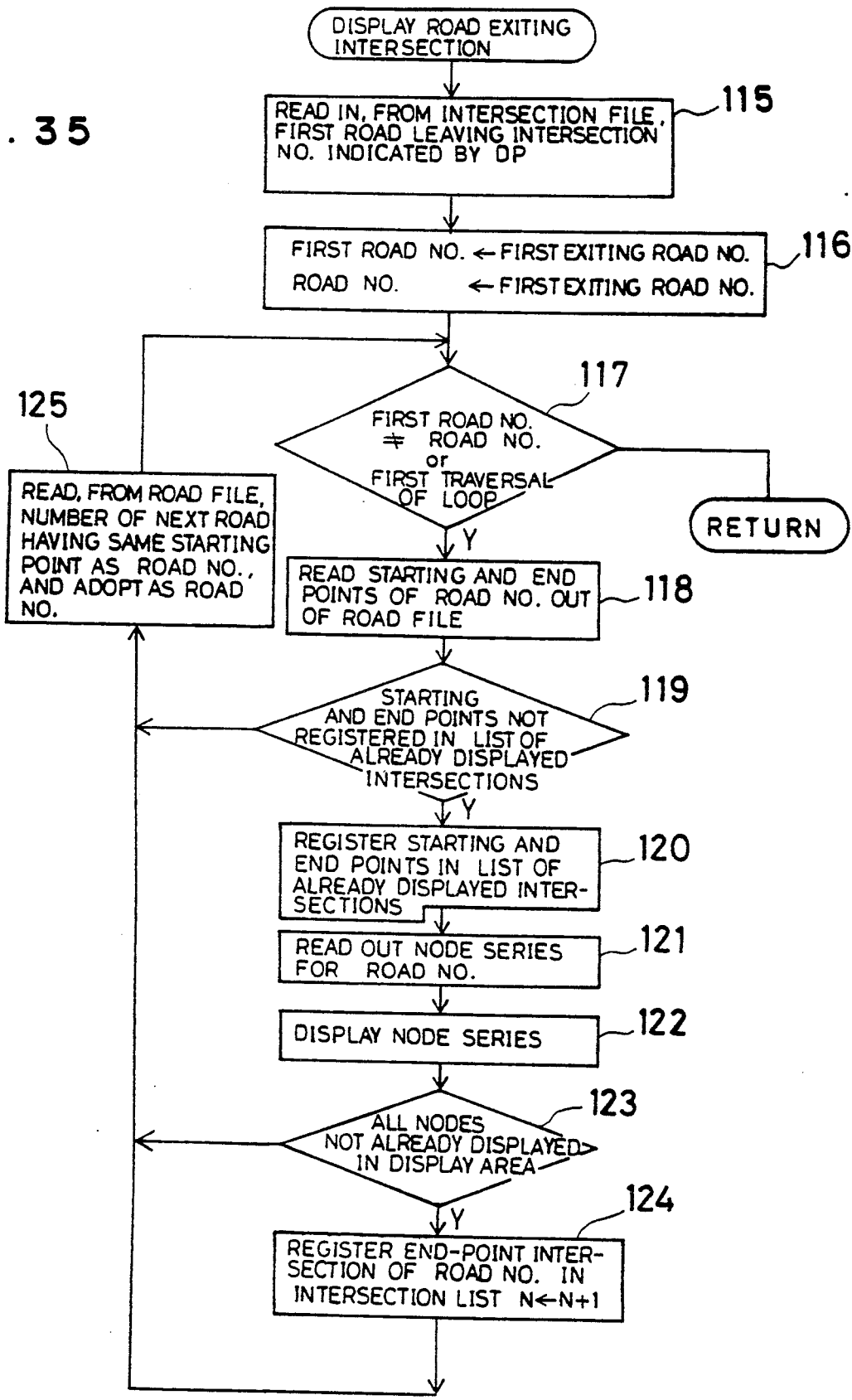
FIG. 35 is a flowchart of processing for displaying a road leaving an intersection.

FIG. 35 illustrates the flow of processing for displaying a road exiting an intersection at step 104 of FIG. 32. This entails reading in, from the intersection file (FIG. 27), the number 1 of the first exiting road at intersection number 1. The first road number and the road number are made 1 at step 116. Since this is the first time the present loop is traversed, the starting-point intersection 1 and the end-point intersection 2 are read out at step 118. It is determined at step 119 whether the starting-point intersection 1 and end-point intersection 2 have been registered in a list of already displayed intersections. If they have not been registered, the starting-point intersection 1 and end-point intersection 2 are registered in the list of already displayed intersections at step 120. At steps 121, 122, the node series (135.5, 35.5, 135.4, 35.4) regarding road number 1 is read out and the node series is displayed upon being converted into display screen coordinates using the abovementioned rotation coefficient and enlargement coefficient. If intersection 2 is found not to be in the display range at step 123, the intersection 2 is registered in the intersection list and the number N of intersection lists is incremented. The number of the next road having the same starting point as road number 1 is read out of the road file (FIG. 28), and the processing of steps 117-125 is subsequently repeated to display road numbers 1, 3, 5.

Figure 36:
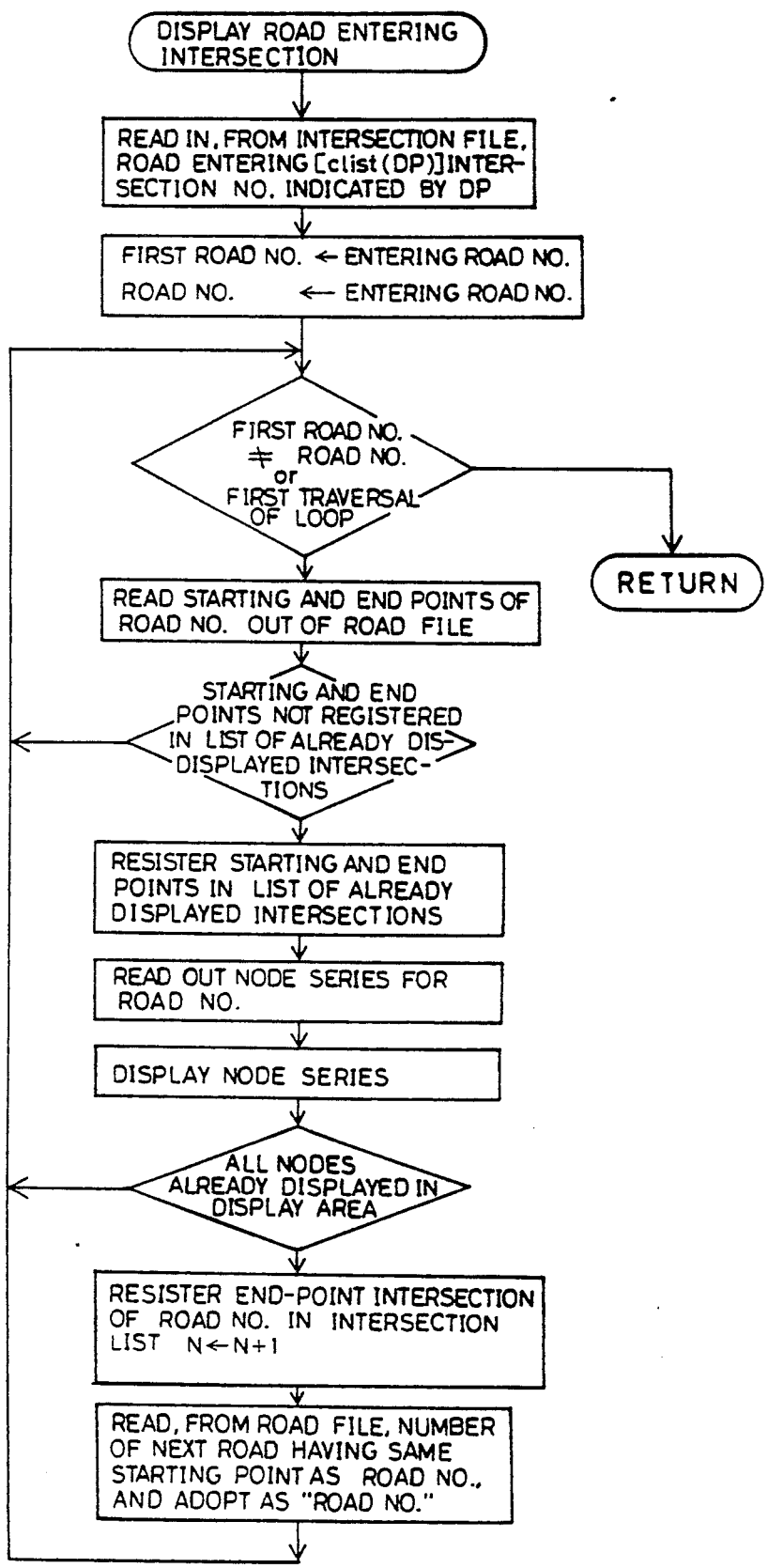
FIG. 36 is a flowchart of processing for displaying a road entering an intersection.

FIG. 36 illustrates the flow of processing for displaying a road entering an intersection at step 105 of FIG. 32. This processing is similar to that of FIG. 35 and a description thereof will be deleted.

Figure 37:
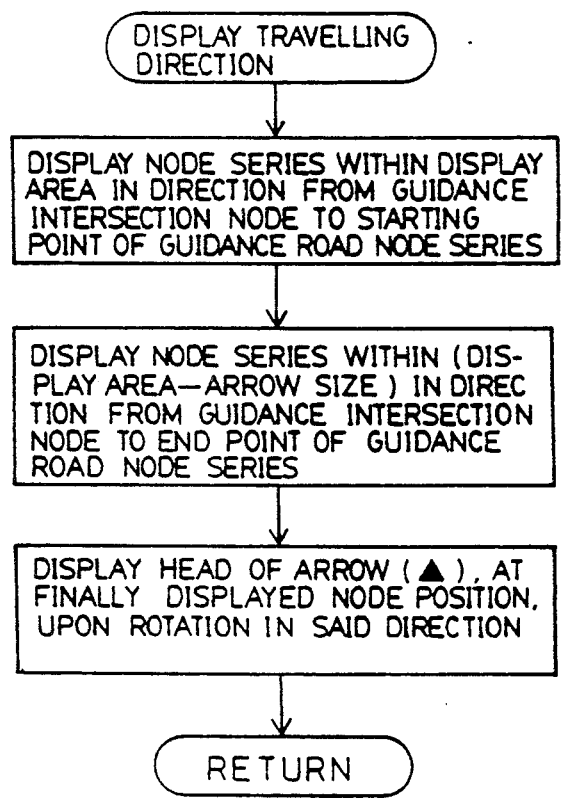
FIG. 37 is a flowchart of processing for displaying direction of travel.
Figure 38:
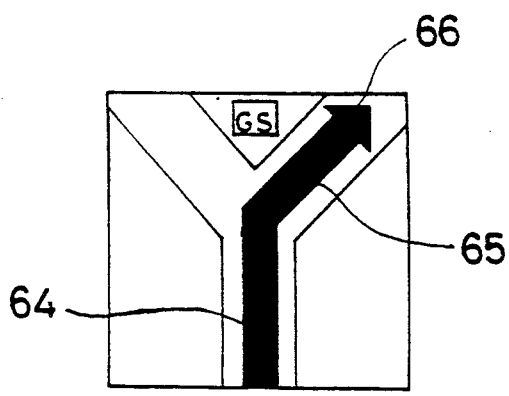
FIG. 38 is a view for describing an example of a display.

FIG. 37 illustrates the flow of processing for describing the direction of travel at step 107 of FIG. 2. This will be described in conjunction with FIG. 38. First, a node series 64 is displayed, in the display area, in the direction from the guidance intersection node of the guidance path node series to the starting point, a node series 65, which is obtained by subtracting the size of the arrow from the boundary line of the display area, is displayed in the direction from the guidance intersection of the guidance course node series to the end point of the node series. The head 66 of the arrow mark is painted, with its head rotated in the abovementioned direction, at the finally displayed node position.

Figure 39:
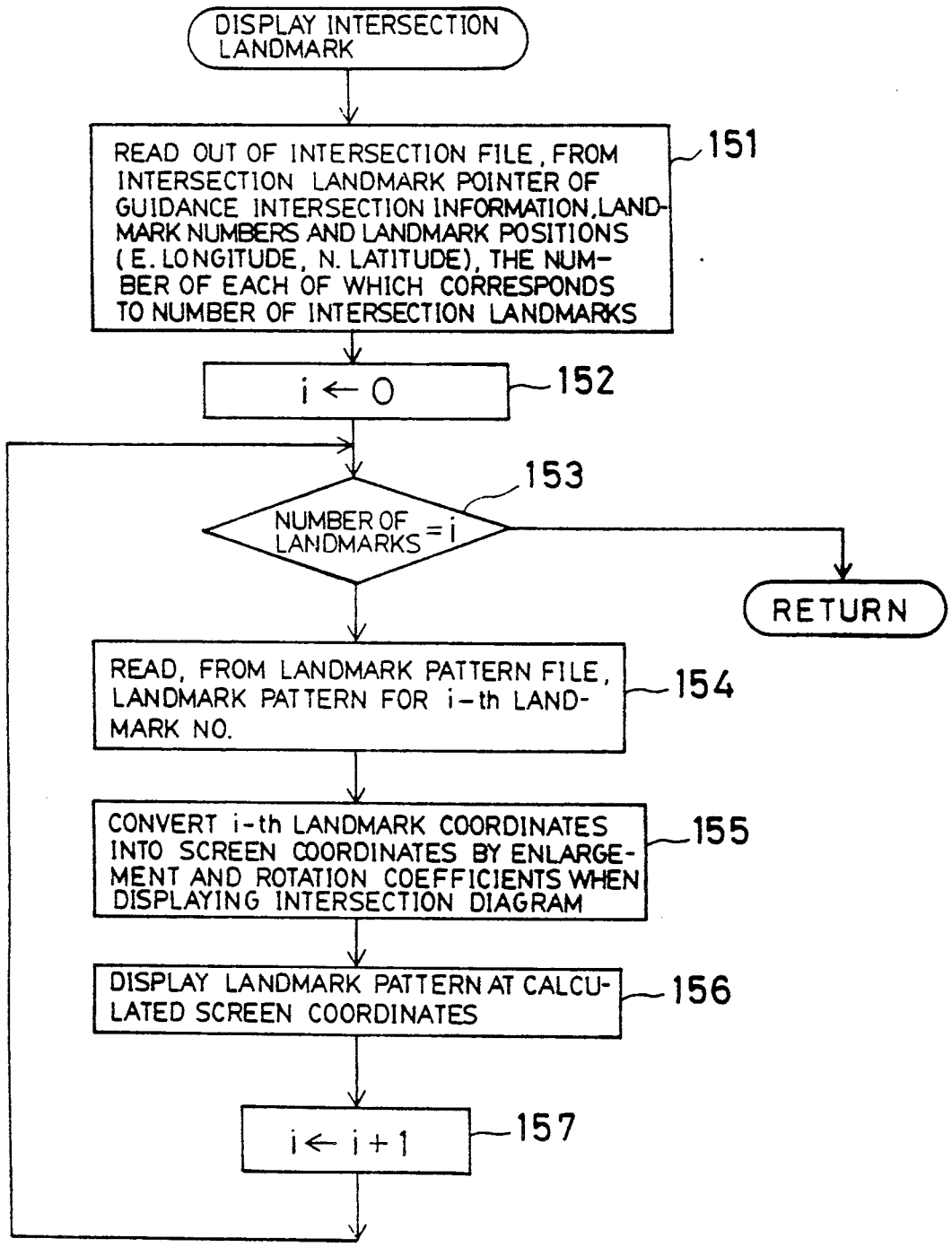
FIG. 39 is a flowchart of processing for displaying intersection landmarks.
Figure 40:
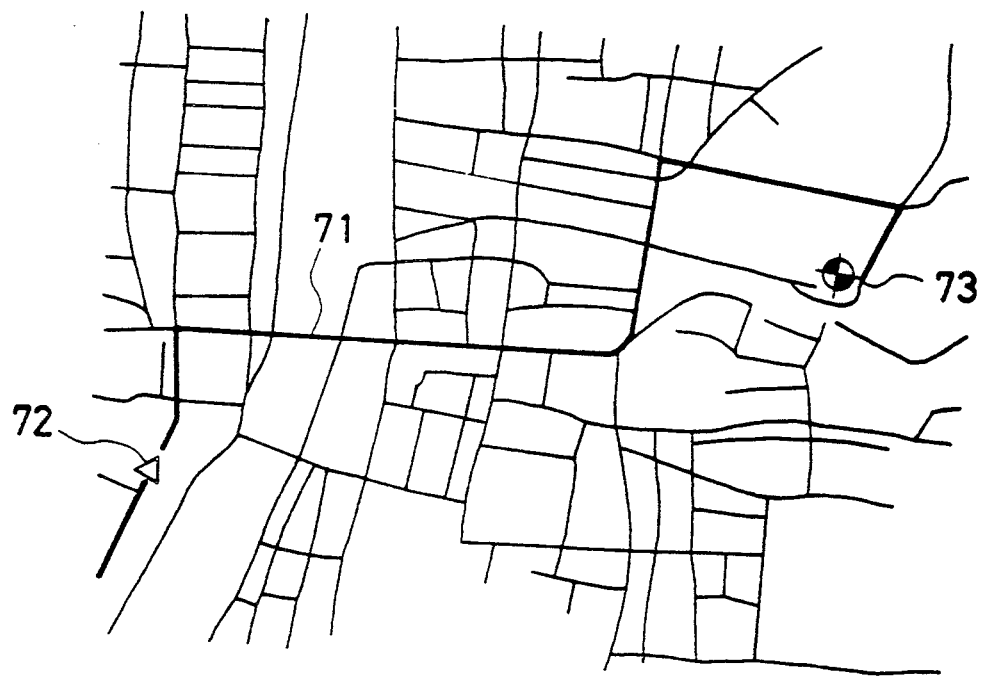
FIG. 40 is a view illustrating a prior-art example of a navigation apparatus.
Figure 41:
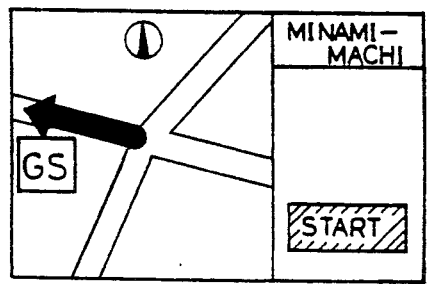
FIG. 41 is a view illustrating an example of a method of displaying an intersection at a point of departure.

FIG. 39 illustrates the flow of processing for displaying an intersection landmark at step 108 of FIG. 2.

Step 151 calls for reading out, from the intersection landmark pointers (FIG. 27) of the guidance intersection, landmark pattern numbers and landmark positions, the number of which correspond to the number of intersection landmarks in FIG. 29. The landmark pattern for the i-th landmark number is read out of the landmark pattern file (FIG. 30) at step 154. The coordinates of the i-th landmark are transformed at step 155 into display screen coordinates by the enlargement and rotation coefficients that prevail when the intersection diagram is displayed, and the landmark pattern is displayed (FIG. 38) at the calculated screen coordinates at step 156.

The present invention is not limited to the foregoing embodiment but can be modified in various ways.

For example, in the foregoing embodiment, the intersection diagram is generated automatically. However, the invention is not limited to this arrangement, for it is permissible to store intersection diagrams in the form of several patterns and display an intersection landmark on the intersection pattern.

Industrial Applicability

The display device in a navigation apparatus of the present invention is mounted on a vehicle to simplify driving guidance.

We claim:

1. A navigation apparatus for setting a route from a designated departure point to a destination point and providing guidance along the route, comprising:
    input means for inputting the departure point and the destination point,
    output means for displaying a route from the departure point to the destination point,
    memory means with map data having road data and intersection data,
    means for determining the route from the departure point to the destination point based on the map data,
    means for calculating a present position on the route,
    means for calculating the distance from the present position to the destination point,
    means for deciding a scale ratio based on the distance for displaying the route from the present position to the destination point,
    means for setting a departure intersection in response to the present position, and
    means for rotating the route so that the road, on which the present position is located, is displayed below the set intersection,
    said scale ratio being calculated in such a manner that the present position, the destination point and the route fall within the range of the display.

2. A navigation apparatus according to claim 1, further comprising:
    means for selecting roads for display in conformity with the scale ratio.

3. A navigation apparatus according to claim 2, wherein said road data includes a road width.

4. A navigation apparatus according to claim 1, wherein said map data also includes node data with information relating to attributes of position information, wherein said intersection data includes information relating to intersections, and wherein said road data includes information relating to roads.

5. A navigation apparatus according to claim 1, further comprising:
    means for displaying the explored route in a specific color.

6. A navigation apparatus according to claim 1, wherein said means for rotating the route includes an operation key, whereby the route is rotated by operating the key.

7. A navigation apparatus according to claim 6 wherein sid rotating means, in response to the operation key, rotates the display so that a next road to the set intersection is displayed below the set intersection.

* * * * *